US009792488B2

(12) United States Patent
Takaoka

(10) Patent No.: US 9,792,488 B2
(45) Date of Patent: Oct. 17, 2017

(54) ADJACENT PERSON SPECIFYING APPARATUS, ADJACENT PERSON SPECIFYING METHOD, ADJACENT PERSON SPECIFYING PROGRAM, AND ADJACENT PERSON SPECIFYING SYSTEM

(75) Inventor: Tomohisa Takaoka, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 248 days.

(21) Appl. No.: 14/110,871

(22) PCT Filed: May 9, 2012

(86) PCT No.: PCT/JP2012/062438
§ 371 (c)(1),
(2), (4) Date: Oct. 9, 2013

(87) PCT Pub. No.: WO2012/161036
PCT Pub. Date: Nov. 29, 2012

(65) Prior Publication Data
US 2014/0037157 A1  Feb. 6, 2014

(30) Foreign Application Priority Data

May 25, 2011 (JP) .................................. 2011-117029

(51) Int. Cl.
*G06K 9/00* (2006.01)
*G06Q 30/02* (2012.01)
(Continued)

(52) U.S. Cl.
CPC ... *G06K 9/00295* (2013.01); *G06F 17/30265* (2013.01); *G06K 9/00288* (2013.01);
(Continued)

(58) Field of Classification Search
CPC .. G06Q 50/01; G06Q 30/02; G06F 17/30265; G06K 9/00295
See application file for complete search history.

(56) References Cited

U.S. PATENT DOCUMENTS

| 6,351,265 | B1 * | 2/2002 | Bulman ........................ 345/660 |
| 7,336,807 | B2 * | 2/2008 | Tabata ............... G06K 9/00228 382/103 |

(Continued)

FOREIGN PATENT DOCUMENTS

| JP | 2002-344867 | 11/2002 |
| JP | 2003-67309 | 3/2003 |

(Continued)

OTHER PUBLICATIONS

International Search Report issued Aug. 21, 2012 in PCT/JP2012/062438.

*Primary Examiner* — Chan Park
*Assistant Examiner* — Mia M Thomas
(74) *Attorney, Agent, or Firm* — Chip Law Group

(57) ABSTRACT

An information processing apparatus that obtains content data and first position information corresponding to the content data; obtains second position information corresponding to a second person having a predetermined relationship with a first person associated with creating the content data; and associates identification corresponding to the second person with the content data based on a predetermined relationship between the first position information and the second position information.

19 Claims, 24 Drawing Sheets

(51) Int. Cl.
  *G06Q 50/00* (2012.01)
  *G06F 17/30* (2006.01)
(52) U.S. Cl.
  CPC ......... *G06K 9/00677* (2013.01); *G06Q 30/02* (2013.01); *G06Q 50/01* (2013.01)

(56) References Cited

U.S. PATENT DOCUMENTS

| | | | | |
|---|---|---|---|---|
| 8,522,310 | B1* | 8/2013 | Buckwalter et al. | 726/2 |
| 8,537,648 | B1* | 9/2013 | Lu | G11B 7/08505 369/44.28 |
| 8,634,589 | B2* | 1/2014 | Shimizu | G06K 9/00771 348/169 |
| 8,762,473 | B2* | 6/2014 | Stibel | G06Q 30/0255 370/352 |
| 8,912,953 | B2* | 12/2014 | Jeong | G01S 19/28 342/357.28 |
| 9,195,880 | B1* | 11/2015 | Levoy | G06F 17/30247 |
| 9,378,570 | B2* | 6/2016 | Kasahara | G06Q 30/02 |
| 9,471,982 | B2* | 10/2016 | Shimizu | G06K 9/00771 |
| 2002/0186412 | A1* | 12/2002 | Murashita | H04N 1/00127 358/1.16 |
| 2004/0107191 | A1* | 6/2004 | Osaka | G01S 5/0072 |
| 2004/0165754 | A1* | 8/2004 | Tabata | G06K 9/00228 382/118 |
| 2006/0013448 | A1* | 1/2006 | Itoh | G06K 9/00087 382/115 |
| 2006/0215881 | A1* | 9/2006 | Nakajima | G01B 11/024 382/106 |
| 2006/0228000 | A1* | 10/2006 | Miyajima | G06K 9/00798 382/104 |
| 2007/0023653 | A1* | 2/2007 | Toyoda | G06T 7/0006 250/310 |
| 2007/0121826 | A1* | 5/2007 | Sako | H04M 1/7253 379/88.21 |
| 2008/0036871 | A1* | 2/2008 | Ohmura et al. | 348/222.1 |
| 2008/0101700 | A1* | 5/2008 | Onishi | G06K 9/222 382/181 |
| 2008/0123907 | A1* | 5/2008 | Eura | G06K 9/00288 382/118 |
| 2009/0152463 | A1* | 6/2009 | Toyoda | G06T 7/0006 250/311 |
| 2009/0171570 | A1* | 7/2009 | Chiba | G01C 21/3682 701/532 |
| 2009/0307345 | A1* | 12/2009 | Carter | G06Q 30/02 709/224 |
| 2010/0112989 | A1* | 5/2010 | Andreasson | H04L 67/18 455/414.2 |
| 2010/0191728 | A1* | 7/2010 | Reilly | G06F 17/30265 707/736 |
| 2010/0265177 | A1* | 10/2010 | Fujimoto | G06T 11/00 345/162 |
| 2010/0277611 | A1* | 11/2010 | Holt | G06F 17/30265 348/231.2 |
| 2010/0302595 | A1* | 12/2010 | Yamada | G06K 9/4642 358/1.18 |
| 2011/0055296 | A1* | 3/2011 | Shimazaki et al. | 707/822 |
| 2011/0075891 | A1* | 3/2011 | Yokoyama | G06F 17/30817 382/115 |
| 2011/0080478 | A1* | 4/2011 | Kohno | G06F 3/147 348/143 |
| 2011/0119230 | A1* | 5/2011 | Zuber | G06F 17/30011 707/608 |
| 2011/0145327 | A1* | 6/2011 | Stewart | G06F 17/3002 709/203 |
| 2011/0182485 | A1* | 7/2011 | Shochat | G06K 9/00221 382/118 |
| 2011/0285658 | A1* | 11/2011 | Homma | G06F 1/1626 345/173 |
| 2011/0307318 | A1* | 12/2011 | LaPorte | G06Q 20/209 705/14.33 |
| 2011/0321028 | A1* | 12/2011 | Evans et al. | 717/170 |
| 2012/0173610 | A1* | 7/2012 | Bleau | H04L 67/26 709/203 |
| 2012/0174203 | A1* | 7/2012 | Frank | 726/7 |
| 2012/0179641 | A1* | 7/2012 | Ishioka | G06F 17/30707 706/54 |
| 2012/0272287 | A1* | 10/2012 | Kuhlke | H04W 4/206 726/1 |
| 2013/0039590 | A1* | 2/2013 | Yoshio | G06K 9/00288 382/218 |
| 2013/0063581 | A1* | 3/2013 | Komatsu | G06K 9/00926 348/77 |
| 2013/0110802 | A1* | 5/2013 | Shenoy et al. | 707/706 |
| 2013/0125069 | A1* | 5/2013 | Bourdev | G06F 3/04845 715/863 |
| 2013/0232159 | A1* | 9/2013 | Daya | G06Q 50/01 707/758 |
| 2013/0262588 | A1* | 10/2013 | Barak | H04L 67/22 709/204 |
| 2014/0003648 | A1* | 1/2014 | Fedorovskaya et al. | 382/100 |
| 2014/0006513 | A1* | 1/2014 | Takaoka | G06Q 50/01 709/204 |
| 2014/0012663 | A1* | 1/2014 | Ransom | G06Q 30/02 705/14.45 |
| 2014/0225914 | A1* | 8/2014 | Kasahara | G06Q 30/02 345/629 |
| 2014/0280590 | A1* | 9/2014 | Nemer | G06Q 30/0214 709/204 |
| 2015/0062007 | A1* | 3/2015 | Itoh | G09G 5/00 345/156 |
| 2015/0139508 | A1* | 5/2015 | Ye | G06K 9/00892 382/116 |
| 2016/0188858 | A1* | 6/2016 | Moriya | G06K 9/00892 726/18 |
| 2016/0232552 | A1* | 8/2016 | Kim | H04W 4/02 |

FOREIGN PATENT DOCUMENTS

| | | | | |
|---|---|---|---|---|
| JP | 2008-165701 | | 7/2008 | |
| JP | 2011-76237 | | 4/2011 | |
| WO | PCT/IL2009/0003 16 | * | 3/2009 | G06K 9/68 |
| WO | WO 2010/084242 A1 | | 7/2010 | |

* cited by examiner

FIG. 3

| FILE NAME | TIME | POSITION | ADJACENT PERSONS |
|---|---|---|---|
| PIC1 | 04/01/2011 12:00 | 35.57685, 139.65870 | UA, UB, UC |
| PIC2 | 04/01/2011 12:01 | 35.57685, 139.65870 | UA, UB, UC |
| PIC3 | 04/01/2011 12:02 | 35.57685, 139.65870 | UA, UB, UC |
| PIC11 | 04/02/2011 15:00 | 33.57685, 135.65870 | UB, UC |
| PIC12 | 04/02/2011 15:01 | 33.57685, 135.65870 | UB, UC |
| ⋮ | ⋮ | ⋮ | ⋮ |

| ACCOUNT | PERSON | TERMINAL | SNS TO WHICH THEY BELONG | GROUP TO WHICH THEY BELONG | FRIENDS |
|---|---|---|---|---|---|
| SNS1_UA | UA | 10 | SNS1 | GRP1, GRP2 | SNS1_UB, SNS1_UC |
| SNS1_UB | UB | 11A | SNS1 | GRP1, GRP2 | SNS1_UA, SNS1_UC |
| SNS1_UC | UC | 11B | SNS1 | GRP1 | SNS1_UA, SNS1_UB |
| ⋮ | ⋮ | ⋮ | ⋮ | ⋮ | ⋮ |

| SNS TO WHICH THEY BELONG | ACCOUNT | TIME | POSITION |
|---|---|---|---|
| SNS1 | SNS1_UA | 04/01/2011 12:00 | 35.57685, 139.65870 |
| SNS1 | SNS1_UB | 04/01/2011 12:00 | 35.57685, 139.65870 |
| SNS1 | SNS1_UC | 04/01/2011 12:00 | 35.57685, 139.65870 |
| SNS1 | SNS1_UA | 04/01/2011 12:10 | 35.87685, 139.15870 |
| SNS1 | SNS1_UB | 04/01/2011 12:10 | 35.87685, 139.15870 |
| SNS1 | SNS1_UC | 04/01/2011 12:10 | 35.87685, 139.15870 |
| ⋮ | ⋮ | ⋮ | ⋮ |

FIG. 10
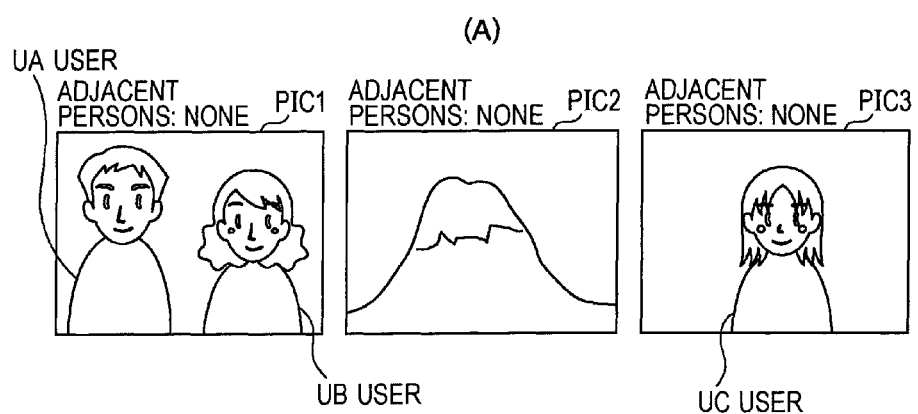
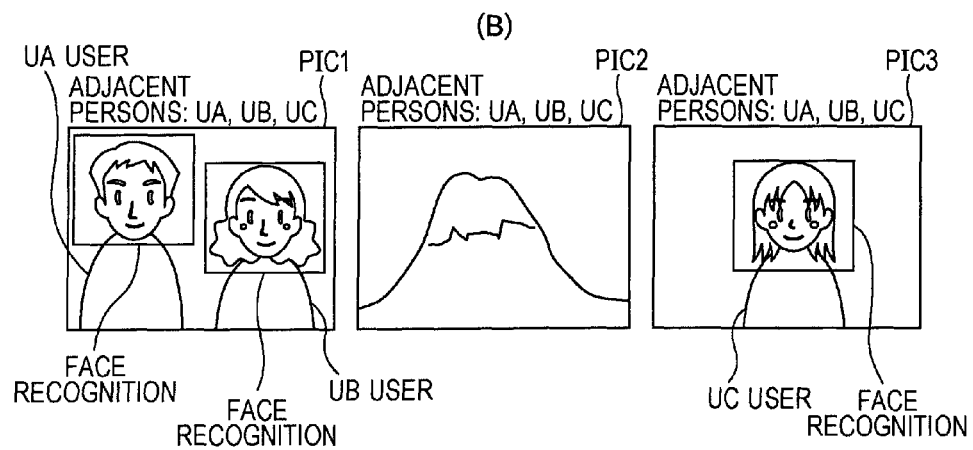

FIG. 16

| FILE NAME | ADJACENT PERSONS |
|---|---|
| PIC1 | UA, UB, UC |
| PIC2 | UA, UB, UC |
| PIC3 | UA, UB, UC |
| PIC11 | UB, UC |
| PIC12 | UB, UC |
| ⋮ | ⋮ |

ADJACENT PERSON SPECIFYING APPARATUS, ADJACENT PERSON SPECIFYING METHOD, ADJACENT PERSON SPECIFYING PROGRAM, AND ADJACENT PERSON SPECIFYING SYSTEM

TECHNICAL FIELD

The present technique relates to an adjacent person specifying apparatus, an adjacent person specifying method, an adjacent person specifying program, and an adjacent person specifying system, which are preferably applied, for example, to an imaging apparatus which images and stores an object in association with predetermined information.

BACKGROUND ART

In recent years, an imaging apparatus capable of organizing a plurality of picture data items based on added information and searching for desired picture data by storing the picture data with various information added thereto when the picture data generated by imaging an object is stored has been distributed.

As such an imaging apparatus, an apparatus which specifies a person by performing face recognition on an object, for example, and adding information indicating the specified person to picture data has been proposed (see Patent Literature 1, for example).

CITATION LIST

Patent Literature

PTL 1: Japanese Unexamined Patent Application Publication No. 2008-165701

SUMMARY OF INVENTION

According to such an imaging apparatus, in some cases there may be a person who was not photographed in a picture as an object by chance although the person was positioned near the imaging apparatus at the time of imaging.

Since the imaging apparatus cannot detect the person only by performing face recognition in such a case, it is not possible to add information indicating the person to the picture data only by face recognition. Therefore, it is necessary for a user operating the imaging apparatus to manually add the information indicating the person to the picture data, and there is a concern in that the user is forced to perform a complicated operation.

The present technique has been contrived in consideration of the above point in order to provide an adjacent person specifying apparatus capable of creating content with useful information added thereto with a simple operation.

According to a first embodiment, the present disclosure is directed to an information processing apparatus comprising: a processor that obtains content data and first position information corresponding to the content data; obtains second position information corresponding to a second person having a predetermined relationship with a first person associated with creating the content data; and associates identification corresponding to the second person with the content data based on a predetermined relationship between the first position information and the second position information.

According to another exemplary embodiment, the disclosure is directed to an information processing method performed by an information processing apparatus, the method comprising: obtaining, by a processor of the information processing apparatus, content data and first position information corresponding to the content data; obtaining, by the processor, second position information corresponding to a second person having a predetermined relationship with a first person associated with creating the content data; and associating, by the processor, identification corresponding to the second person with the content data based on a predetermined relationship between the first position information and the second position information.

According to another exemplary embodiment, the disclosure is directed to a non-transitory computer-readable medium including computer program instructions, which when executed by an information processing apparatus, cause the information processing apparatus to perform a method comprising: obtaining content data and first position information corresponding to the content data; obtaining second position information corresponding to a second person having a predetermined relationship with a first person associated with creating the content data; and associating identification corresponding to the second person with the content data based on a predetermined relationship between the first position information and the second position information.

According to another exemplary embodiment, the disclosure is directed to an information processing system comprising: a first information processing apparatus that obtains content data and first position information corresponding to the content data, and transmits a request including the first position information to a second information processing apparatus; and the second information processing apparatus that, in response to the request, obtains second position information corresponding to a second person having a predetermined relationship with a first person associated with creating the content data, and transmits the second position information to the first information processing apparatus, wherein the first information processing apparatus associates identification corresponding to the second person with the content data based on a predetermined relationship between the first position information and the second position information.

Thus, the present technique can realize an adjacent person specifying apparatus, an adjacent person specifying method, an adjacent person specifying program, and an adjacent person specifying system which are capable of allowing creation of content with useful information added thereto with a simple operation.

BRIEF DESCRIPTION OF DRAWINGS

FIG. 3 is an outlined line drawing showing a data format of picture data according to the first and third to eighth embodiments.

FIG. 5 is an outlined line drawing showing a configuration of a friendship management table.

FIG. 6 is an outlined line drawing showing a configuration of a location table.

FIG. 10 is an outlined line drawing for illustrating enhancement in precision of adjacent person specification by face recognition processing.

FIG. 16 is an outlined line drawing showing a data format of picture data according to the second, ninth, and tenth embodiments.

DESCRIPTION OF EMBODIMENTS

Hereinafter, modes for carrying out the invention (hereinafter, referred to as embodiments) will be described. In addition, the description will be given in the following order.

1. First embodiment (in a case in which adjacent person extracting processing is performed in a terminal of a person taking a picture with the use of a position sharing SNS server)

2. Second embodiment (in a case in which adjacent person specifying processing is performed with the use of ad hoc communication)

3. Third embodiment (in a case in which adjacent person extracting processing is performed in a position sharing SNS server)

4. Fourth embodiment (in a case in which a terminal of a person taking a picture periodically receives other-person position information from a position sharing SNS server)

5. Fifth embodiment (in a case in which adjacent person specifying processing and face recognition processing are performed when picture data is organized)

6. Sixth embodiment (in a case in which adjacent person specifying processing is performed immediately after imaging and face recognition processing is performed when picture data is organized)

7. Seventh embodiment (in a case in which adjacent person extracting processing is performed in a position sharing SNS server when picture sharing processing is performed)

8. Eighth embodiment (in a case in which imaging is performed by an imaging apparatus and adjacent person specifying processing is performed by a terminal of a person taking a picture)

9. Ninth embodiment (in a case in which a terminal of a person taking a picture inquires of an SNS server about friendship based on a terminal ID received from an adjacent terminal)

10. Tenth embodiment (in a case in which inquiry to an adjacent terminal is performed with a terminal ID)

11. Other embodiments

1. First Embodiment

1-1. Configuration of Adjacent Person Specifying System

Figure 1:
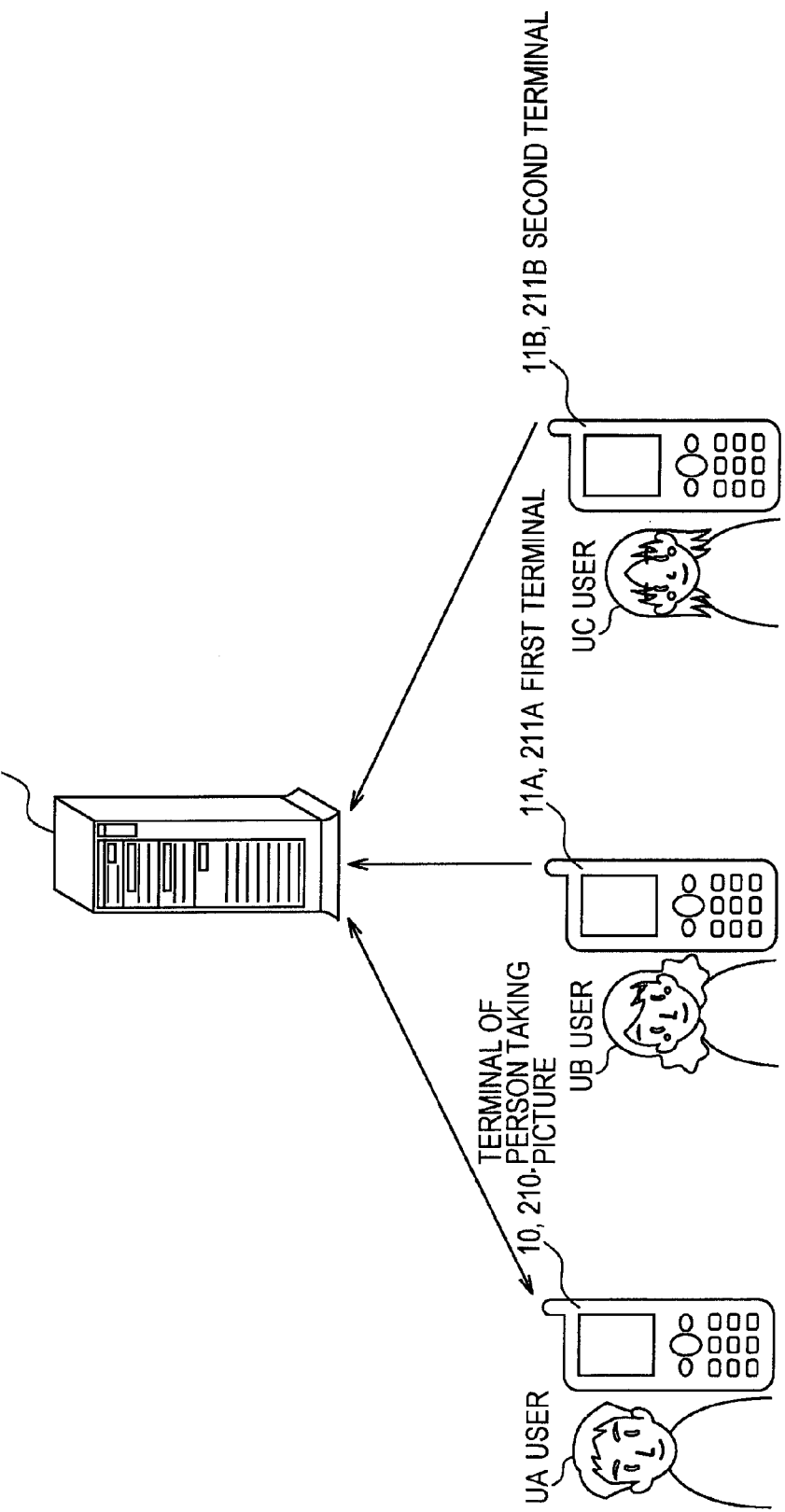
FIG. 1 is an outlined line drawing showing an overall configuration of an adjacent person specifying system according to first and third to eighth embodiments.

As shown in FIG. 1, an adjacent person specifying system 1 according to the first embodiment is configured by a terminal 10 of a person taking a picture, a plurality of terminals 11 (first terminal 11A, second terminal 11B, . . . (hereinafter, only the first terminal 11A and the second terminal 11B will be described)), and a position sharing SNS (Social Network Service) server 12.

The position sharing SNS server 12 is configured to provide a social networking service (hereinafter, also be referred to as an SNS) and allow users who join the SNS to establish friendship in the SNS. The position sharing SNS server 12 according to the embodiment manages an SNS named SNS 1.

The terminal 10 of a person taking a picture, the first terminal 11A, and the second terminal 11B are respectively owned by a user UA, a user UB, and a user UC. The users UA, UB, and UC belong to an SNS provided by the position sharing SNS server 12 and establish friendships with each other.

The terminal 10 of a person taking a picture, the first terminal 11A, and the second terminal 11B respectively transmit their own position information to the position sharing SNS server 12 and causes the position sharing SNS server 12 to store the position information at a predetermined time interval. The position sharing SNS server 12 is configured to open mutual position information to the users among whom friendships have been established in the SNS 1.

The terminal 10 of a person taking a picture, the first terminal 11A, and the second terminal 11B are configured so as to be able to share mutual terminal positions, namely mutual positions of the users who own the terminals by receiving mutual position information stored in the position sharing SNS server 12.

Moreover, the terminal 10 of a person taking a picture, the first terminal 11A, and the second terminal 11B are respectively configured so as to be able to mutually share content by creating the content such as picture data or the like by operations of the users UA, UB, and UC, transmitting the content to the position sharing SNS server 12, and causing the position sharing SNS server 12 to store the content.

1-2. Configuration of Terminal of a Person Taking a Picture

Figure 2:
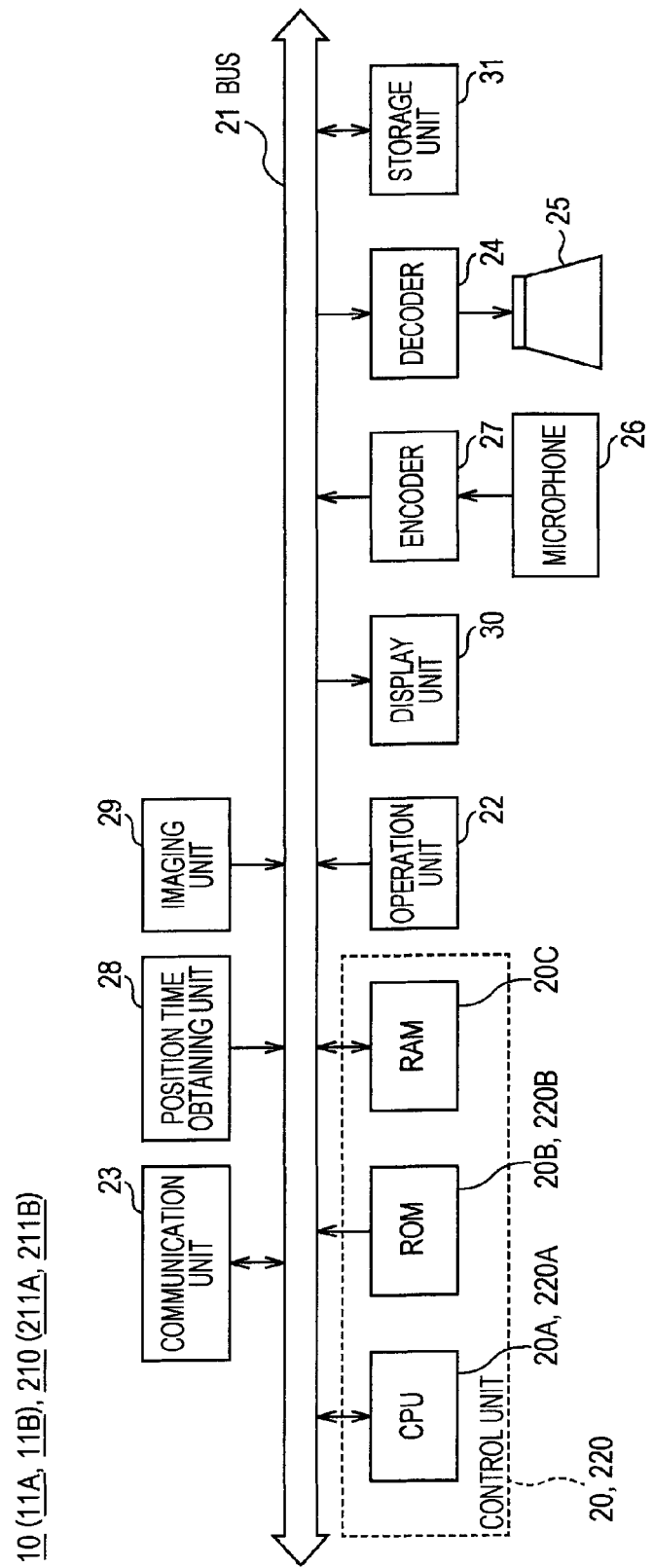
FIG. 2 is an outlined line drawing showing a circuit configuration of a terminal of a person taking a picture according to the first and third to eighth embodiments.

In FIG. 2, the terminal 10 of a person taking a picture is configured so as to be able to perform a telephone call and communication of various data items as a whole with an external device and is also configured so as to be able to perform imaging of an object, recording of sound, and the like. In addition, the terminal 10 of a person taking a picture, the first terminal 11A, and the second terminal 11B have the same configurations, and therefore, description will later be given only of the terminal 10 of a person taking a picture.

The terminal 10 of a person taking a picture is configured to perform overall control on a whole by a control unit 20, and the control unit 20 and each part are connected via a bus 21. The control unit 20 is mainly configured by a CPU (Central Processing Unit) 20A and is provided with a ROM (Read Only Memory) 20B on which various programs are stored and a RAM (Random Access Memory) 20C used as a work area of the CPU 20A.

The control unit 20 is configured so as to be able to perform various kinds of processing by developing and executing an adjacent person specifying program, a face recognition program, a picture management program, and the like read from the ROM 20B on the RAM 20C.

The operation unit 22 is provided with various operation buttons such as a direction button, an enter button, and the like, which is for operating a GUI (Graphical User Interface) menu or the like, and a touch panel and the like.

The operation unit 22 sends an instruction order in accordance with a pressing operation by a user on the operation button and the touch panel to the control unit 20 via the bus 21. The control unit 20 is configured to execute various kinds of processing in response to the instruction order.

For example, when the user UA owing the terminal 10 of a person taking a picture performs a telephone call with an external device, the terminal 10 of a person taking a picture receives a received signal from a base station, which is not shown in the drawing, by a communication unit 23.

The communication unit 23 converts the received signal into received data by performing demodulation or the like thereon based on a predetermined scheme and sends this to a decoder 24. The decoder 24 recovers a telephone call sound data of the counterpart by decoding the received data based on control by the control unit 20 and outputs the telephone call sound data to a speaker 25. The speaker 25 outputs telephone call sound of the counterpart based on the telephone call sound data.

On the other hand, the terminal 10 of a person taking a picture sends a sound signal collected from a microphone 26 to an encoder 27. The encoder 27 sends sound data, which has been obtained by performing digital conversion on the sound signal based on control by the control unit 20 and then encoding the sound signal by a predetermined scheme, to the communication unit 23.

In addition, when sound recording function is selected by a user's operation, the terminal 10 of a person taking a picture stores as sound data the sound signal collected from the microphone 26 on the storage unit 31, which is configured by a nonvolatile memory, for example, via the encoder 27.

A position time obtaining unit 28 calculates position information indicating a current position and time information indicating current time based on position measurement information (a GPS signal, for example) received from a position measuring means such as a GPS (Global Positioning System) satellite or the like and sends all of them as time position information to the control unit 20. In addition, the position time obtaining unit 28 is configured to perform position measurement with the use of an access point based on Wi-Fi (Wireless Fidelity) and position measurement with the use of a mobile base station.

An imaging unit 29 is configured by a camera so as to image a stationary image or a moving image in response to a user's operation. The imaging unit 29 outputs picture data obtained by imaging an object to a display unit 30 and causes the display unit 30 to perform display in the case of imaging a stationary image, while the imaging unit 29 displays moving image data obtained by imaging an object on the display unit 30 in the case of imaging a moving image.

In so doing, although the terminal 10 of a person taking a picture is configured so as to be able to generate sound data, picture data, and moving image data, the following description will be given of a case in which picture data is generated.

When picture data is generated by a user operating the imaging unit 29, the terminal 10 of a person taking a picture adds position information and time information to the picture data and stores the picture data on the storage unit 31. Here, as a data format of the picture data shown in FIG. 3, the picture data include information indicating file names, time, positions, and adjacent persons. For example, the fact that a picture in a file named "PIC1" was imaged at time "2011/04/01 12:00" at a position "35.57685(latitude), 139.65870(longitude)" and adjacent persons (which will be described later in detail) at that time were the users UA, UB, and UC is shown.

In addition, in the following, picture data generated by a user's operation, moving image data, sound data, memos, mails, various kinds of Playlog such as music, games, television, and the like, GPS log, jogging log, and the like will collectively be referred to as content. In addition, picture data and moving image data including images will collectively be referred to as image content, and moving image data and sound data including sound will collectively be referred to as sound content.

In addition, addition of adjacent person information, which indicates persons who were present near the user when the user created content, to the content will also be referred to as tag addition.

The terminal 10 of a person taking a picture is configured to transmit and receive various kinds of information such as time information, position information, and the like, picture data, and the like to the aforementioned position sharing SNS server 12 via the communication unit 23.

On the other hand, the first terminal 11A and the second terminal 11B configured in the same manner as terminal 10 of a person taking a picture are configured to cause the terminal owned by the user belonging to the SNS1 to share their own current position by periodically transmitting position time information, which has been obtained by the position time obtaining unit 28, to the position sharing SNS server 12 via the communication unit 23.

1-3. Configuration of Position Sharing SNS Server

Figure 4:
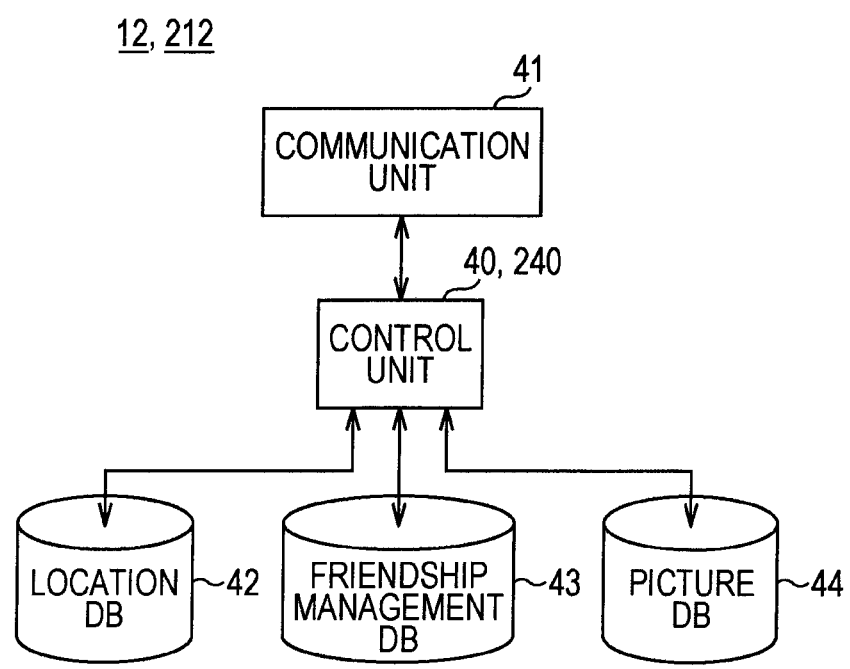
FIG. 4 is an outlined line drawing showing a circuit configuration of a position sharing SNS server according to the first and third to eighth embodiments.

As shown in FIG. 4, the position sharing SNS server 12 is configured to manage users, who join the social networking service SNS1, as a whole and configured by a control unit 40, a communication unit 41, a location DB (database) 42, a friendship management DB 43, and a picture DB 44.

The control unit 40 is provided with a CPU, a ROM, and a RAM which are not shown in the drawing and configured to perform overall control on the entire position sharing SNS server 12.

The friendship management DB 43 stores a friendship management table TB1 shown in FIG. 5, in which various kinds of information of the users who join the SNS 1 are described. The friendship management table TB1 manages users, who join the SNS 1, by accounts, and information indicating a person, a terminal, an SNS to which they belong, a group to which they belong, and their friends is associated and stored in an account.

For example, an account "SNS 1_UA" indicates the user UA owning the terminal 10 of a person taking a picture, and belongs to groups GRP1 and GRP2 among groups, each of which indicates a gathering of a plurality of accounts.

In addition, in the account "SNS 1_UA", accounts "SNS 1_UB" and "SNS 1_UC" are registered as friends who have approved each other in advance by a predetermined method. This represents that the user UA are in friendships with the user UB corresponding to the account "SNS 1_UB" and the user UC corresponding to the account "SNS 1_UC", respectively.

The communication unit 41 periodically receives position time information from the first terminal 11A and the second terminal 11B and transmits the position time information to the location DB 42 based on control by the control unit 40.

The location DB 42 stores a location table TB2 shown in FIG. 6, in which position information and time information represented by the position time information transmitted from the terminal owned by the user belonging to the SNS 1 are accumulated. The location table TB2 is configured by items indicating belonging SNSs, accounts, time, and positions.

In addition, in the location table TB2, location information in which time information and position information are associated with each other for each account of the user belonging to the SNS 1 is accumulated. As described above, the location table TB2 indicates when and where the user belonging to the SNS 1 was present.

The communication unit 41 is also configured to receive picture data transmitted from the user belonging to the SNS1 and causes the picture DB 44 to store the picture data. In addition, the communication unit 41 is configured to receive picture data from the terminal 10 of a person taking a picture, the first terminal 11A, and the second terminal 11B and transmit the picture data stored on the picture DB 44 to the terminals in response to requests from the terminal 10 of a person taking a picture, the first terminal 11A, and the second terminal 11B.

In so doing, the position sharing SNS server 12 is configured to allow the terminal 10 of a person taking a picture, the first terminal 11A, and the second terminal 11B to share picture data imaged by each of them.

1-4. Adjacent Person Specifying Processing Procedure

Next, description will be given of an adjacent person specifying processing procedure RT1 according to a first embodiment with the use of a sequence chart shown in FIG. 7.

Figure 8:
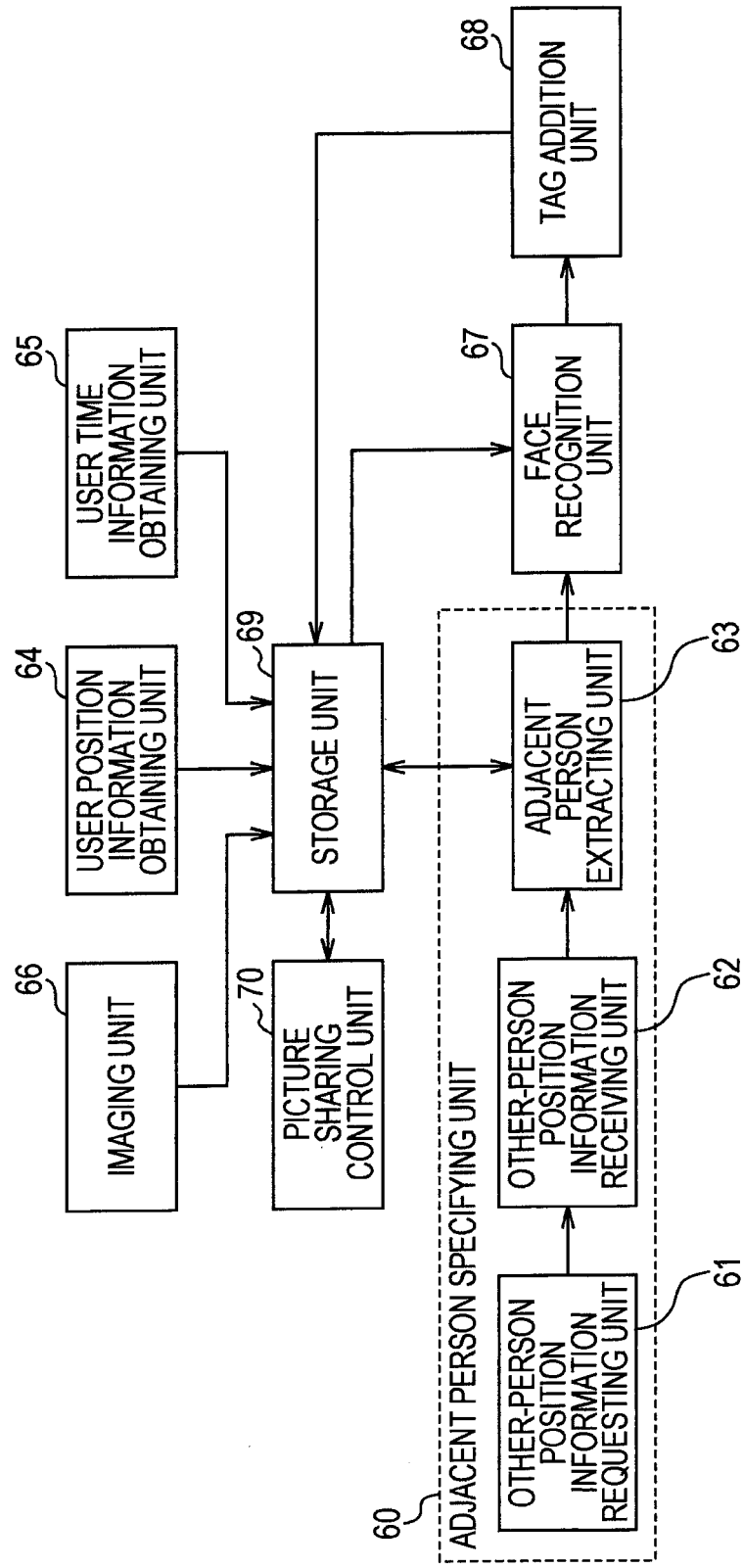
FIG. 8 is an outlined line block diagram showing a functional block configuration of a terminal of a person taking a picture according to the first embodiment.

Here, basic functions in relation to the adjacent person specifying processing in the terminal 10 of a person taking a picture are represented as a functional block diagram as in FIG. 8.

In FIG. 8, an adjacent person specifying unit 60 corresponds to the control unit 20 and the communication unit 23 (FIG. 2) and realizes each of the functional blocks of an other-person position information requesting unit 61, an other-person position information receiving unit 62, and an adjacent person extracting unit 63 by executing a predetermined adjacent person specifying program in the control unit 20. In addition, a user position information obtaining unit 64 and a user time information obtaining unit 65 are corresponding to the position time obtaining unit 28, an imaging unit 66 corresponds to the imaging unit 29, a face recognition unit 67 and a tag addition unit 68 correspond to the control unit 20, and a storage unit 69 corresponds to the storage unit 31, respectively.

Figure 9:
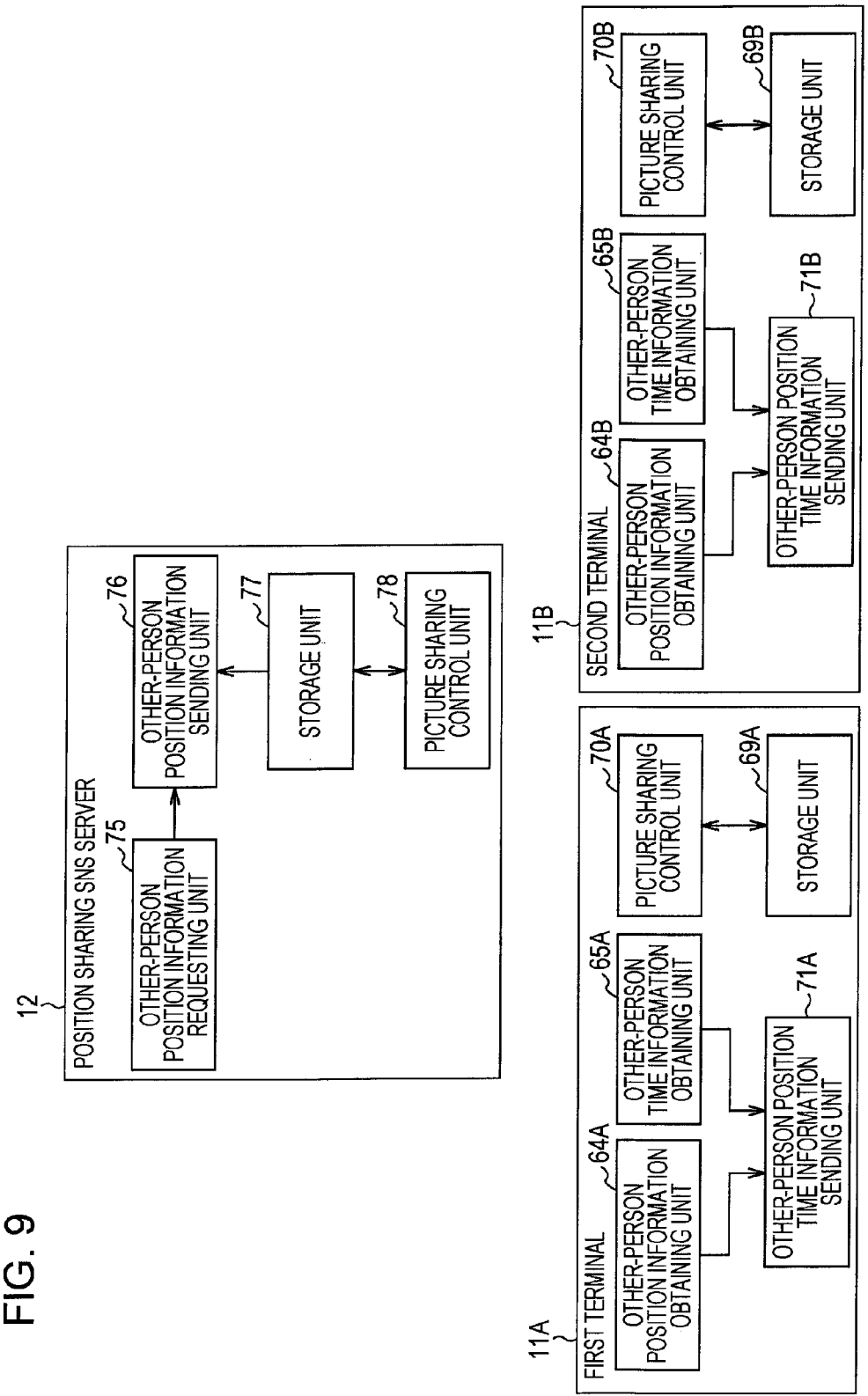
FIG. 9 is an outlined line block diagram showing functional block configurations of a first terminal, a second terminal, and a position sharing SNS server according to the first embodiment.

Moreover, basic functions in relation to the adjacent person specifying processing in the first terminal 11A, the second terminal 11B, and the position sharing SNS server 12 are represented as functional block diagrams as in FIG. 9.

In the first terminal 11A in FIG. 9, an other-person position information obtaining unit 64A and an other-person time information obtaining unit 65A corresponds to the position time obtaining unit 28 in the first terminal 11A (FIG. 2), and an other-person position and time information sending unit 71A corresponds to the control unit 20 and the communication unit 23, respectively.

In addition, in the second terminal 11B in FIG. 9, an other-person position information obtaining unit 64B and an other person time information obtaining unit 65B correspond to the position time obtaining unit 28 in the second terminal 11B (FIG. 2), and an other-person position and time information sending unit 71B corresponds to the control unit 20 and the communication unit 23, respectively.

Furthermore, in the position sharing SNS server 12 in FIG. 9, an other-person position information request receiving unit 75 and an other-person position information sending unit 76 correspond to the control unit 40 and the communication unit 41 (FIG. 4), a storage unit 77 corresponds to the location DB 42, the picture DB 44, and the friendship management DB 43, respectively.

In Step SP1 in the adjacent person specifying processing procedure RT1 (FIG. 7), other-person position information obtaining unit 64A and other person time information obtaining unit 65A in the first terminal 11A periodically (at an interval of 10 minutes, for example) obtain position information and time information, respectively, and the other-person position time information sending unit 71A transmits the position information and the time information as other-person position time information to the position sharing SNS server 12. In addition, although the position and time information is transmitted to the position sharing SNS server 12 from the terminal 10 of a person taking a picture as well in practice, this will be omitted for convenience of description.

In Step SP2, the other-person position information obtaining unit 64B and the other person time information obtaining unit 65B in the second terminal 11B periodically obtain position information and time information, respectively, and the other-person position time information sending unit 71B transmits the position information and the time information as other-person position time information to the position sharing SNS server 12.

An imaging unit 66 of the terminal 10 of a person taking a picture an object and generates picture data in Step SP3 and adds the position information obtained by the user position information obtaining unit 64 and the time information obtained by the user time information obtaining unit 65 by embedding the information in the picture data, and causes the storage unit 69 to store the information in Step SP4.

In Step SP5, the other-person position information requesting unit 61 transmits an other-person position information request for requesting position information of the user belonging to the SNS 1 to the position sharing SNS server 12.

In Step SP6, other-person position information request receiving unit 75 of the position sharing SNS server 12 receives the other-person position information request from the terminal 10 of a person taking a picture.

In Step SP7, the other-person position information sending unit 76 reads latest position information of all users belonging to the SNS 1 from the storage unit 77 and transmits the position information to the terminal 10 of a person taking a picture. Specifically, the other-person position information sending unit 76 reads a position "35.87685, 139.15870" of the account "SNS 1_UB" at latest time "2011/04/01 12:10" and a position "35.87685, 139.15870" of the account "SNS 1_UC" at the latest time "2011/04/01 12:10" from the location table TB2 (FIG. 6) and associates and transmits the positions with accounts to the terminal 10 of a person taking a picture.

Subsequently, the other-person position information receiving unit 62 receives the other-person position information from the position sharing SNS server 12 in Step SP8.

In Step SP9, the adjacent person extracting unit 63 compares position information of a plurality of users described in the other-person position information and position information in the picture data as a target of the adjacent person specifying processing, which is stored in the storage unit 69, and extracts a user near (for example, within 50 m from) a position indicated by the position information of the picture data as an adjacent person.

In Step SP10, the face recognition unit 67 enhances accuracy in the adjacent person specification by performing face recognition processing (which will be described later in detail).

In Step SP11, the tag addition unit 68 performs tag addition on the picture data and transmits the picture data to the storage unit 69. The tag addition unit 68 is configured to perform tag addition on the picture data as the adjacent person information for the user UA as well, who has created the picture data, at this time.

In Step SP12, the storage unit 69 stores the picture data with the tag added thereto.

In so doing, the terminal 10 of a person taking a picture is configured to receive the other-person position information representing a list of the latest position information of the terminals owned by the other users belonging to the SNS 1 from the position sharing SNS server 12 and extract an adjacent person based on the position information of the other terminals described in the other-person position information.

1-5. Face Recognition Processing

Incidentally, in some cases a terminal is not always present at a position whose position measurement information can be obtained, and the terminal may be positioned in doors, or the position measurement information cannot be obtained depending on surrounding environment or the like. In such a case, there is a possibility that the terminal cannot transmit the position time information to the position sharing SNS server 12, or otherwise, there is a possibility that precision in the position of the position time information is low if transmission can be performed.

If the adjacent person specifying processing is performed based on such position information with low precision, the terminal 10 of a person taking a picture cannot precisely specify an adjacent person.

Thus, the terminal 10 of a person taking a picture is configured to enhance the precision in the adjacent person specification by detecting a person photographed in the picture data by performing predetermined face recognition processing in the face recognition unit 67 following the adjacent person specifying processing in the adjacent person specifying unit 60.

Specifically, description will be given on the face recognition processing on data of three pictures (picture data PIC1, PIC2, and PIC3) shown in FIG. 10(A), for example. The picture data PIC1, PIC2, and PIC3 were sequentially imaged in a time series manner.

In addition, since the position information of the other terminals first terminal 11A and the second terminal 11B) at the time at which these pictures were imaged is not stored in the location table TB2 (FIG. 6), the picture data PIC1, PIC2, and PIC3 are assumed to be in a state in which adjacent persons could not be specified in the aforementioned adjacent person specifying processing. Therefore, there is no adjacent person in all of the picture data PIC1, PIC2, and PIC3.

The face recognition unit 67 performs face recognition processing on the picture data PIC1, PIC2, and PIC3 by comparing feature amounts of faces of the objects and feature amounts of faces of users stored in advance on the storage unit 69. In so doing, the face recognition unit 67 detects that the users UA and UB and the user UC were photographed in the picture data PIC1 and the picture data PIC3, respectively, and that no user was photographed in the picture data PIC2.

In so doing, the terminal 10 of a person taking a picture can specify a person as an object even in picture data to which adjacent person information has not been added, by performing the face recognition processing as well as the adjacent person specifying processing.

In so doing, the terminal 10 of a person taking a picture can complement the specification of an adjacent person by specifying a person as an object in the picture data even in a case in which position information is not described in the received other-person position information or a case in which precision in the position is low.

Here, since the picture data PIC1, PIC2, and PIC3 is sequentially generated in a time series manner, it can be said that time and positions at which they were generated are substantially the same in mutual picture data (that is, pictures imaged at time which is close to each other at close positions).

At this time, the tag addition unit 68 adds tags of the users UA, UB, and UC to all of the picture data PIC1, PIC2, and PIC3 as shown in FIG. 10(B).

As described above, the face recognition unit 67 executes the face recognition processing on the picture data which is generated at close time at close positions. Subsequently, the tag addition unit 68 adds tags of all users detected by the face recognition processing to the picture data.

Here, as a reference based on which a picture is determined to have been imaged at close time at close positions, for example, a plurality of pictures imaged on the same day in the same facility, a plurality of pictures imaged in a predetermined time (two or three minutes, or the like), or the like is applicable.

In so doing, the terminal 10 of a person taking a picture can presume an adjacent person even for picture data as the picture data PIC2, to which adjacent person information has not been added, in which no person was photographed as an object, based on picture data with close time information and position information.

1-6. Picture Sharing Processing Procedure

Figure 11:
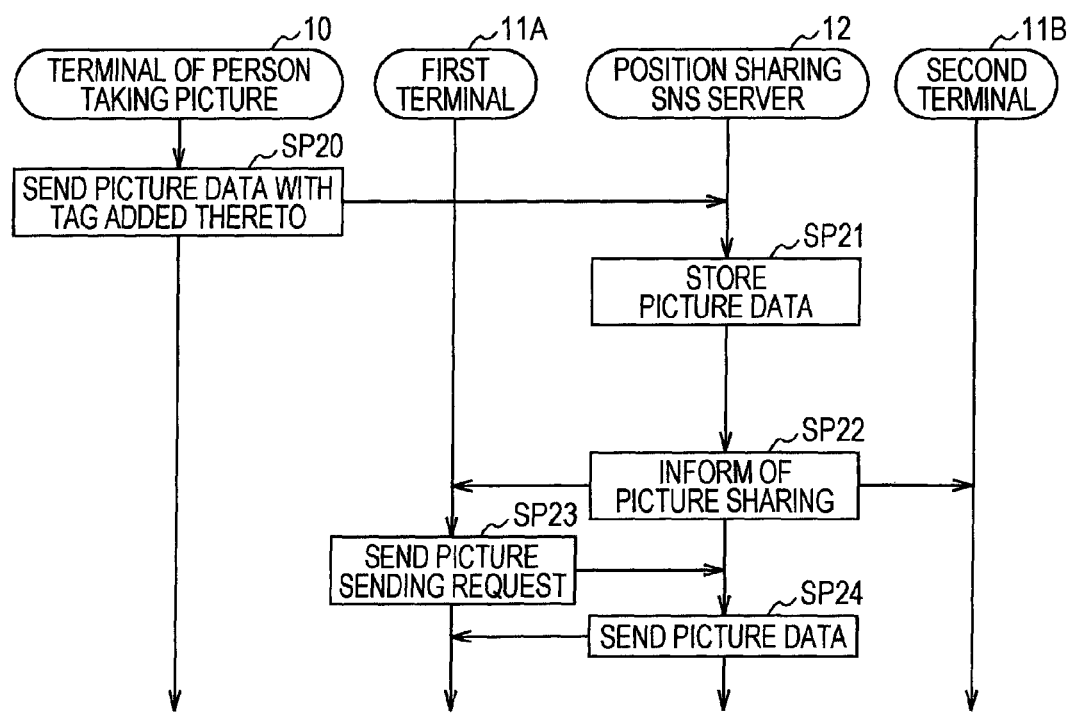
FIG. 11 is a sequence chart showing a picture sharing processing procedure.

Incidentally, the adjacent person specifying system 1 is configured such that it is possible to share picture data among users belonging to the same SNS via the position sharing SNS server 12. As for a picture sharing processing procedure RT2 by which such picture sharing processing is executed, description will be given with the use of a sequence chart shown in FIG. 11 and FIG. 12.

Here, in the terminal 10 of a person taking a picture shown in FIG. 8, a picture sharing control unit 70 corresponds to the control unit 20 and the communication unit 23. In addition, the picture sharing control unit 70A in the first terminal 11A (FIG. 9) corresponds to the control unit 20 and the communication unit 23 in the first terminal 11A (FIG. 2), and a storage unit 69A corresponds to the storage unit 31, respectively. Moreover, the picture sharing control unit 70B in the second terminal 11B (FIG. 9) corresponds to the control unit 20 and the communication unit 23 in the second terminal 11B (FIG. 2), respectively. In addition, a picture sharing control unit 78 in the position sharing SNS server 12 (FIG. 9) corresponds to the communication unit 41 and the control unit 40 (FIG. 4), and a storage unit 77 corresponds to the picture DB 44 and the friendship management DB 43, respectively.

Figure 12:
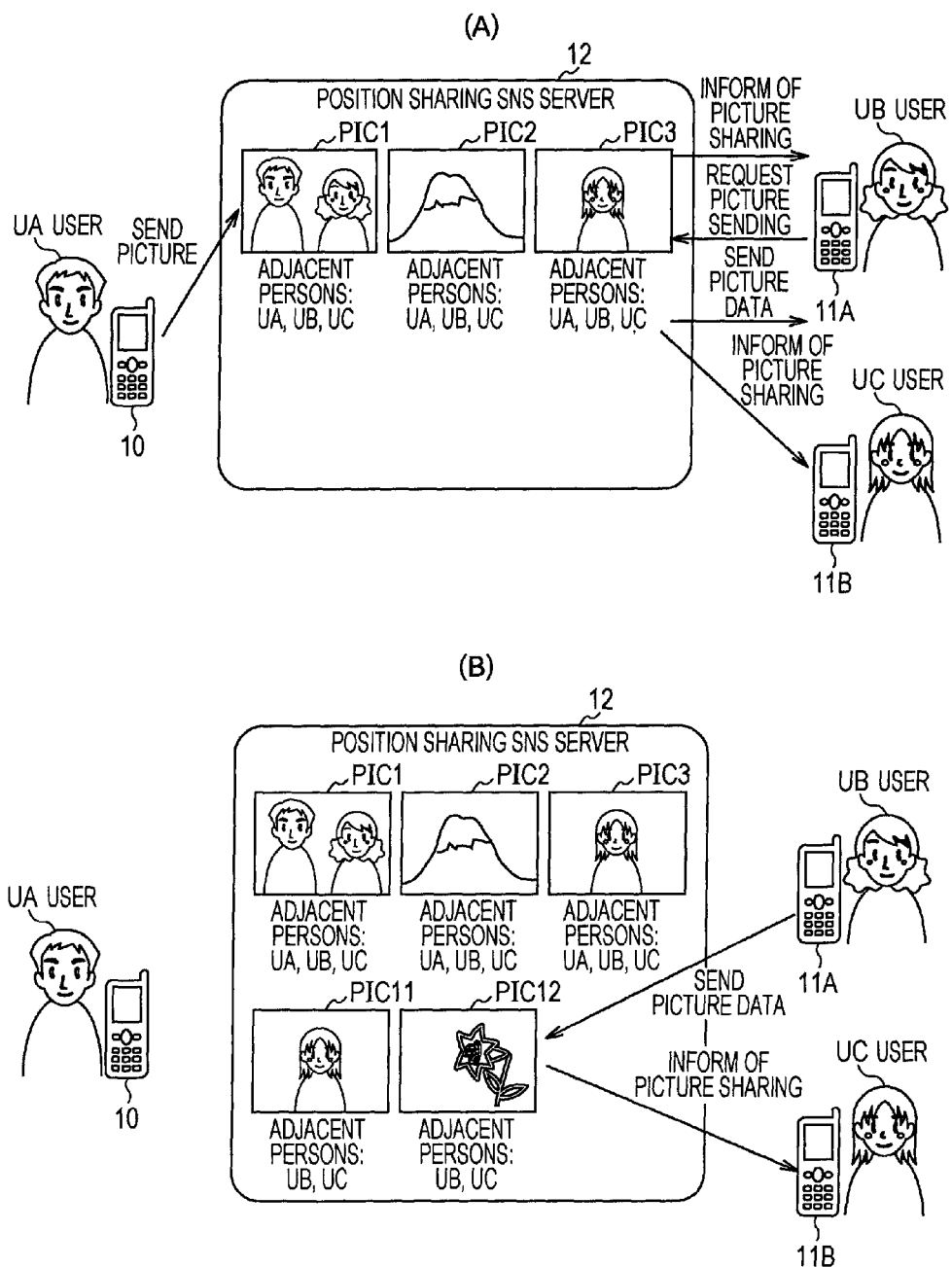
FIG. 12 is an outlined line drawing for illustrating picture sharing processing.

In Step SP20 (FIG. 11), the picture sharing control unit 70 (FIG. 8) in the terminal 10 of a person taking a picture transmits the picture data stored on the storage unit 69 to the position sharing SNS server 12. As shown in FIG. 12 (A), tags of the users UA, UB, and UC as adjacent persons are added to the picture data PIC1, PIC2, and PIC3 transmitted by the terminal 10 of a person taking a picture.

In Step SP21, the picture sharing control unit 78 of the position sharing SNS server 12 causes the picture DB 44 of the storage unit 77 to store the received picture data.

In Step SP22, the picture sharing control unit 78 transmits a picture sharing notification to the first terminal 11A and the second terminal 11B owned by the users UB and UC except for the user UA as a transmission source of the picture data in Step SP20 among the users UA, UB, and UC, the tags of which have been added to the stored picture data as adjacent persons.

The picture sharing notification represents that picture data to which a tag of themselves has been added (that is, a picture in which they were present near the person who captured the image at the time of the imaging) has been uploaded onto the storage unit 77 in a picture imaged by another user, who belongs to the same SNS.

Here, it is assumed that the user UB owning the first terminal 11A desires to obtain the picture data uploaded on the storage unit 77 among the first terminal 11A and the second terminal 11B which have received the picture sharing notification.

In such a case, in Step SP23, the picture sharing control unit 70A of the first terminal 11A (FIG. 9) transmits a picture transmission request, which indicates a request for transmitting the picture data stored on the storage unit 77, to the position sharing SNS server 12 in response to an operation of the user UB.

The picture sharing control unit 78 of the position sharing SNS server 12 which has received the picture transmission request transmits the picture data PIC1, PIC2, and PIC3, which are stored in the storage unit 77, to which the tag of the user UB has been added, to the first terminal 11A in response to the picture transmission request in Step SP24.

In so doing, the first terminal 11A can obtain pictures in which the user UB itself owing the first terminal 11A was photographed as an object or in which the user UB was present nearby.

In addition, as shown in FIG. 12 (B), when the first terminal 11A transmits picture data PIC11 and PIC12, to which tags of the users UB and UC as adjacent persons have been added, to the position sharing SNS server 12, the position sharing SNS server 12 transmits a picture sharing notification to the user UC in the same processing as that described above.

In so doing, the user can obtain picture data in the adjacent person specifying system 1 merely by transmitting a picture transmission request in response to a picture sharing notification transmitted from the position sharing SNS server 12 when the picture data to which a tag of themselves has been added as an adjacent person is uploaded onto the position sharing SNS server 12 by a user belonging to the same SNS.

In addition, the user UA owning the terminal 10 of a person taking a picture can allow the other users to obtain the picture data via the position sharing SNS server 12 without designating the other users with whom the user UA desires to share the picture data stored in the storage unit 69.

1-7. Operations and Effects

In the above configuration, the first terminal 11A and the second terminal 11B respectively owned by the users UB and UC belonging to the SNS 1 periodically transmit other-person position and time information to the position sharing SNS server 12 as another apparatus.

In so doing, the position sharing SNS server 12 can successively obtain the latest positions and time of the terminals owned by the users belonging to the SNS 1.

The terminal 10 of a person taking a picture as the adjacent person specifying apparatus images an object by an operation of the user UA as a user and creates picture data as content in the imaging unit 66 as a content creating unit. Subsequently, the terminal 10 of a person taking a picture obtains user position information indicating position information of the user UA when the picture data is created and the user time information indicating the time information, adds them to the picture data, and stores them on the storage unit 69.

Subsequently, the terminal 10 of a person taking a picture transmits an other-person position information request to the position sharing SNS server 12. Moreover, the terminal 10 of a taking a picture receives the latest position information among position information, which has respectively been transmitted from the first terminal 11A and the second terminal 11B owned by the users UB and UC belonging to the SNS 1 and stored on the position sharing SNS server 12, as the other-person position information from the position sharing SNS server 12.

Subsequently, the terminal 10 of a person taking a picture specifies an adjacent person by comparing the position information of the other terminals described in the other-person position information with the position information in the picture data, which is stored in the storage unit 69, as a target of the adjacent person specifying processing and extracting a user close to a position indicated by the position information in the picture data as an adjacent person.

Moreover, the terminal 10 of a person taking a picture enhances precision in the adjacent person specification by performing the face recognition processing and specifying objects as other persons who were present nearby. In addition, the terminal 10 of a person taking a picture adds tags of the specified adjacent person as other persons who were present near the user when the content was created, to the picture data, a tag of the person himself/herself taking the photo is added, and the picture data is stored in the storage unit 69.

As described above, the terminal 10 of a person taking a picture can enhance precision in specifying adjacent persons even when the other terminals cannot obtain position measurement information or when precision in position is poor, by performing the face recognition processing as well as the adjacent person specifying processing.

In addition, since a tag of the user UA as a user is added to the picture data as an adjacent person, the terminal 10 of a person taking a picture can add not only persons who were present near the user at the time of imaging but also the user himself/herself to the picture data as information.

Moreover, according to the terminal 10 of a person taking a picture, it is possible to organize or search for picture data such as landscape pictures or the like, in particular, from viewpoints not only of an imaging date and an imaging place but also of with whom the landscape was seen, when the picture data stored on the storage unit 69 is organized or searched for later.

In addition, although a method of manually inputting information indicating persons who were present nearby by the person himself/herself taking a picture as a method for adding tags to the picture data, the person taking the picture is forced to perform a significantly complicated operation according to such a method.

On the other hand, in the adjacent person specifying system 1 according to the embodiment, the terminal 10 of a person taking a picture automatically specifies persons who were present near the user UA via the position sharing SNS server 12 and adds tags thereto. Accordingly, all the user UA has to do is perform an operation for requesting other-person position information at the time of imaging.

Incidentally, in the adjacent person specifying system 1, the first terminal 11A and the second terminal 11B are configured to periodically transmit other-person position time information to the position sharing SNS server 12, and the position sharing SNS server 12 is configured to open mutual position information to the users among which friendships has been established. Accordingly, where the users UB and UC are present is always opened to the users in friendships, who belong to the SNS 1 managed by the position sharing SNS server 12.

Therefore, according to the adjacent person specifying system 1, there is a possibility that the counterparts with whom friendships are established are focused on very limited counterparts such as family members and the like, for example.

In order to deal with this, the first terminal 11A and the second terminal 11B may be configured to set their own position information open ranges with respect to the position sharing SNS server 12 for each service. According to the embodiment, the first terminal 11A and the second terminal 11B may set that it is ok to open the position information to friends for the adjacent person specifying service.

In so doing, the adjacent person specifying system 1 can expand friendships in the SNS and allow the adjacent person specifying function to effectively work.

Figure 13:
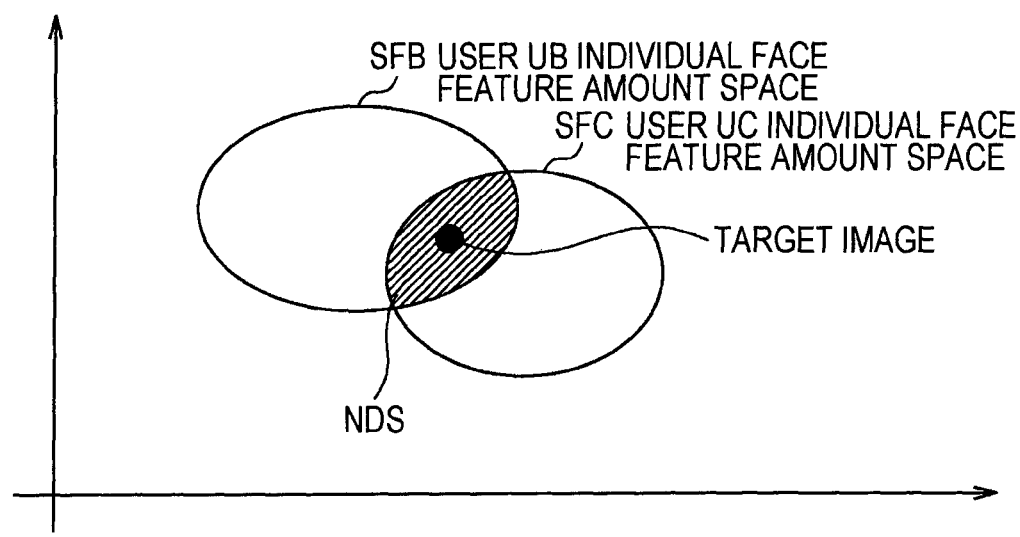
FIG. 13 is an outlined line drawing for illustrating enhancement in precision of face recognition processing.

Incidentally, as a conceptual diagram of general face recognition processing shown in FIG. 13, each user has an individual face feature amount space (for example, the user UB has a user UB individual face feature amount space SFB, and the user UC has a user UC individual face feature amount space SFC) occupying a predetermined range in the face feature amount space SF in which face feature amounts of various users are allotted.

With the use of such a face feature amount space SF, the face recognition processing is performed by determining to which individual face feature amount space an image of a face as a target of the face recognition processing (hereinafter, also referred to as a target image) belongs to among a plurality of individual face feature amount spaces present in the face feature amount space SF. That is, it is determined that a target image shows the user UB when the target image belongs to the user UB individual face feature amount space SFB while a target image shows the user UC when the target image belongs to the user UC individual face feature amount space SFC.

Here, faces of users have common parts to some extent, and a common part between the user UB and the user UC is represented as an overlapped part NDS where mutual individual face feature amount spaces are overlapped in the face feature amount space SF, for example.

Therefore, when a target image is positioned at the overlapped part NDS in the face recognition feature amount space, it is not possible to determine which the target image is among the user UB and the user UC only in general face recognition processing. For example, since there are many common parts in mutual faces and the overlapped part NDS becomes larger in a case in which one of a pair of twins was photographed in a target image or the like, it becomes particularly difficult to perform the face recognition processing.

On the other hand, it is assumed that it was specified that the user UB was present nearby and the user UC was not present nearby as a result of performing the adjacent person specifying processing as in the embodiment when it was not possible to determine which a target image is among the user UB and the user UC in the conventional general face recognition processing. In such a case, it is determined that the target image shows the user UB.

As described above, it is possible to enhance precision in face recognition in the conventional face recognition processing by using adjacent person information as in the embodiment even when a person as an object is specified by performing conventional general face recognition processing.

According to the above configuration, the terminal 10 of a person taking a picture is configured to obtain position information of the user UA when content was created by the user UA, the latest position information stored in the position sharing SNS server 12 is periodically received by each of the first terminal 11A and the second terminal 11B owned by the users UB and UC belonging to the same SNS as that the user UA belongs to, and other users who were present near the user UA when the content was created is extracted based on the position information of the user UA and the position information of the users UB and UC.

In so doing, the terminal 10 of a person taking a picture can specify other users who were present near the user UA when the content was created only by using position information of the other terminals stored in the position sharing SNS server 12 without forcing the user to perform a complicated operation and without holding position information of other terminals. Thus, according to the adjacent person specifying system 1, it is possible to allow creation of content with useful information added thereto with a simple operation.

2. Second Embodiment

2-1. Configuration of Adjacent Person Specifying System

Figure 14:
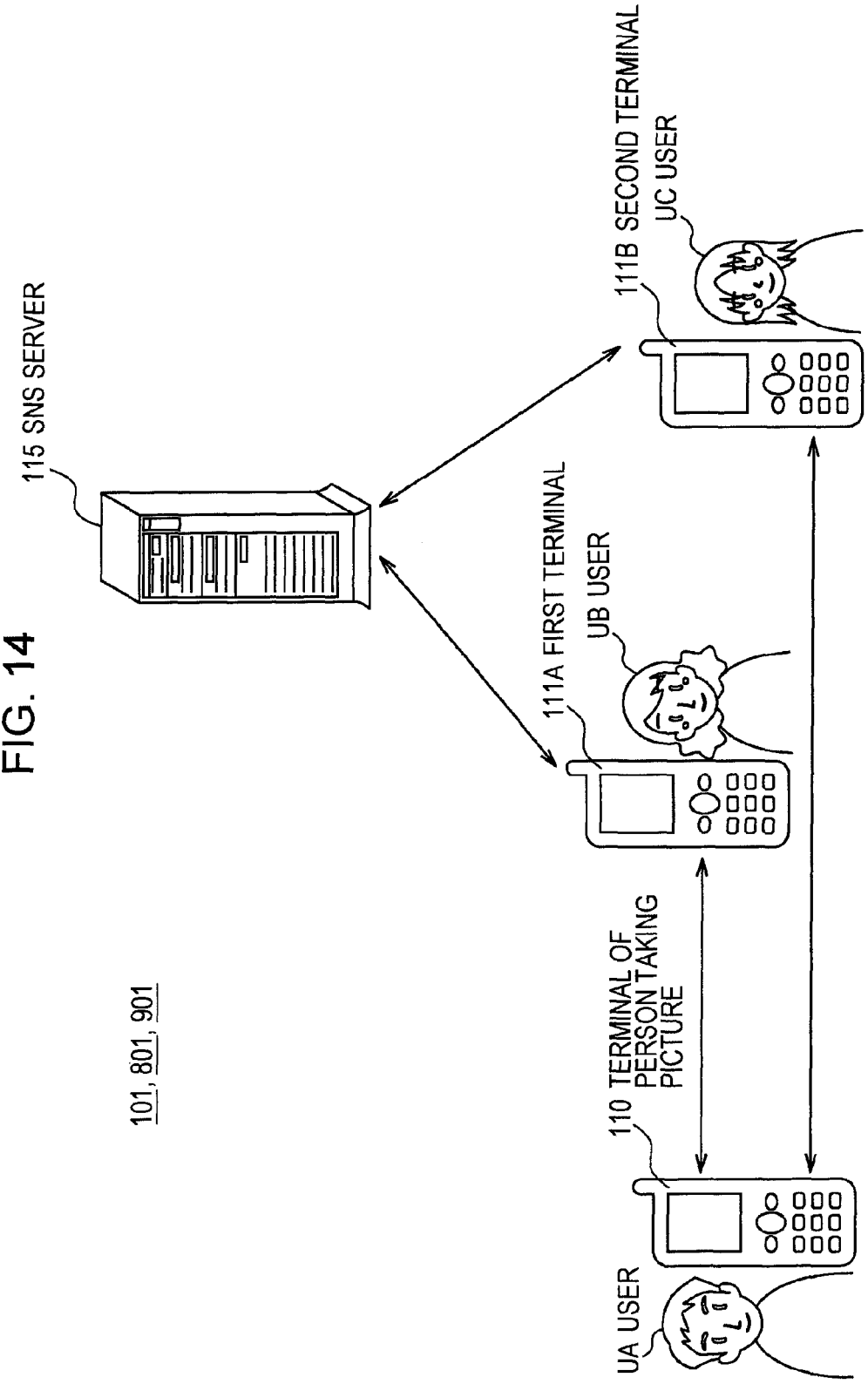
FIG. 14 is an outlined line drawing showing an overall configuration of an adjacent person specifying system according to second, ninth, and tenth embodiments.

As shown in FIG. 14, the adjacent person specifying system 101 according to a second embodiment is provided with an SNS server 115 instead of the position sharing SNS server 12 as compared with the adjacent person specifying system 1 (FIG. 1) according to the first embodiment.

In addition, the adjacent person specifying system 101 is provided with a terminal 110 of the person taking a picture and a plurality of terminals 111 (a first terminal 111A, a second terminal 111B, . . . ) instead of the terminal 10 of a person taking a picture and the plurality of terminals 11 (the first terminal 11A, the second terminal 11B, . . . ) as compared with the adjacent person specifying system 1 (FIG. 1).

In addition, according to the adjacent person specifying system 101, the terminal 110 of the person taking a picture is configured to autonomously construct a network with other terminals (the first terminal 111A and the second terminal 111B) to perform so-called ad hoc communication, unlike the adjacent person specifying system 1.

2-2. Configurations of Terminal of Person Taking Picture and SNS Server

Figure 15:
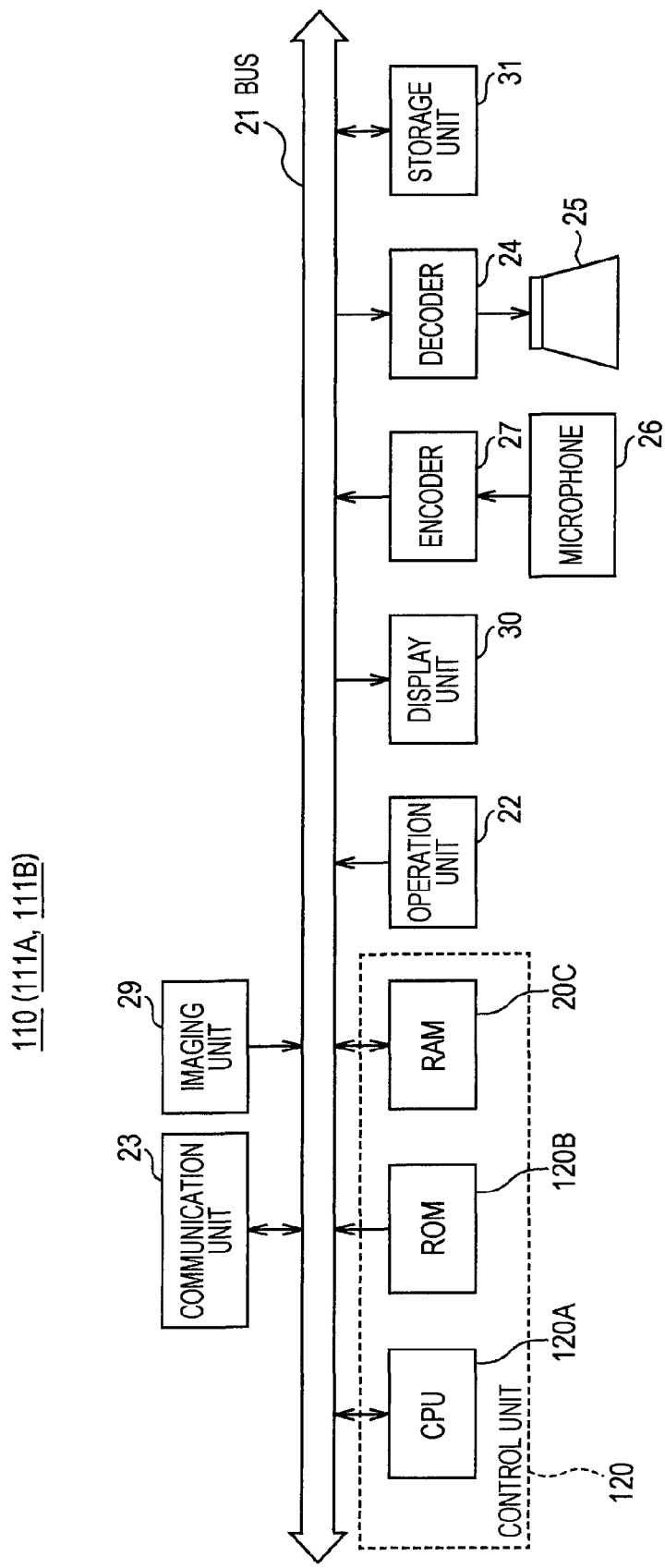
FIG. 15 is an outlined line drawing showing a circuit configuration of a terminal of a person taking a picture according to the second, ninth, and tenth embodiments.

As shown in FIG. 15, the CPU 120A and the ROM 120B in the terminal 110 of a person taking a picture are different from the CPU 20A and the ROM 20B as compared with the terminal 10 of a person taking a picture (FIG. 2), and furthermore, the position time obtaining unit 28 is omitted. In addition, in the following, description will be given of picture data as content created by the user in the same manner as in the first embodiment.

Since the position time obtaining unit 28 is omitted in the terminal 110 of a person taking a picture, time information and position information are omitted in a format of the picture data stored on the storage unit 31 as shown in FIG. 16, as compared with the first embodiment.

Figure 17:
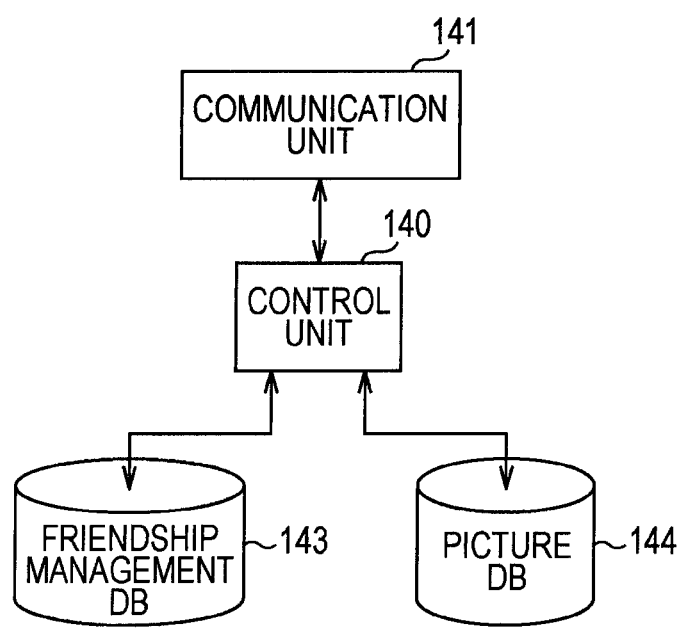
FIG. 17 is an outlined line drawing showing a circuit configuration of an SNS server according to the second, ninth, and tenth embodiments.

As shown in FIG. 17, the location DB 42 is omitted in the SNS server 115 as compared with the position sharing SNS server 12 (FIG. 4).

A friendship management DB 143 according to the second embodiment has the same friendship management table TB1 (FIG. 5) as that in the friendship management DB 43 according to the first embodiment. In addition, in the second embodiment, it is assumed that the user UA and the user UB established a friendship in advance in the SNS 1 while the user UA and the user UC have not yet established a friendship.

2-3. Adjacent Person Specifying Processing Procedure

Figure 18:
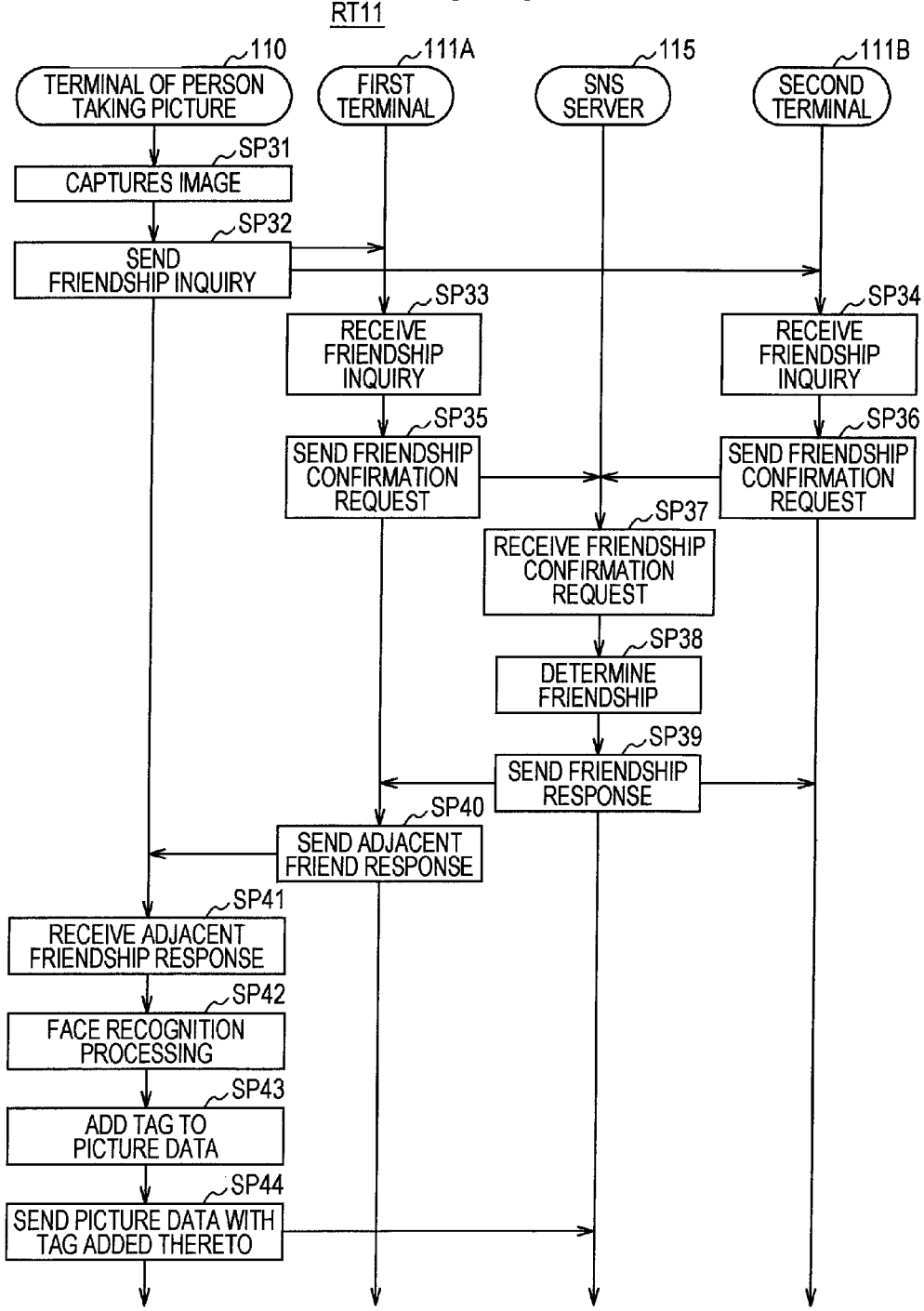
FIG. 18 is a sequence chart showing adjacent person specifying processing procedure according to the second embodiment.

Next, description will be given of the adjacent person specifying processing procedure RT11 according to the second embodiment with the use of a sequence chart shown in FIG. 18.

Figure 19:
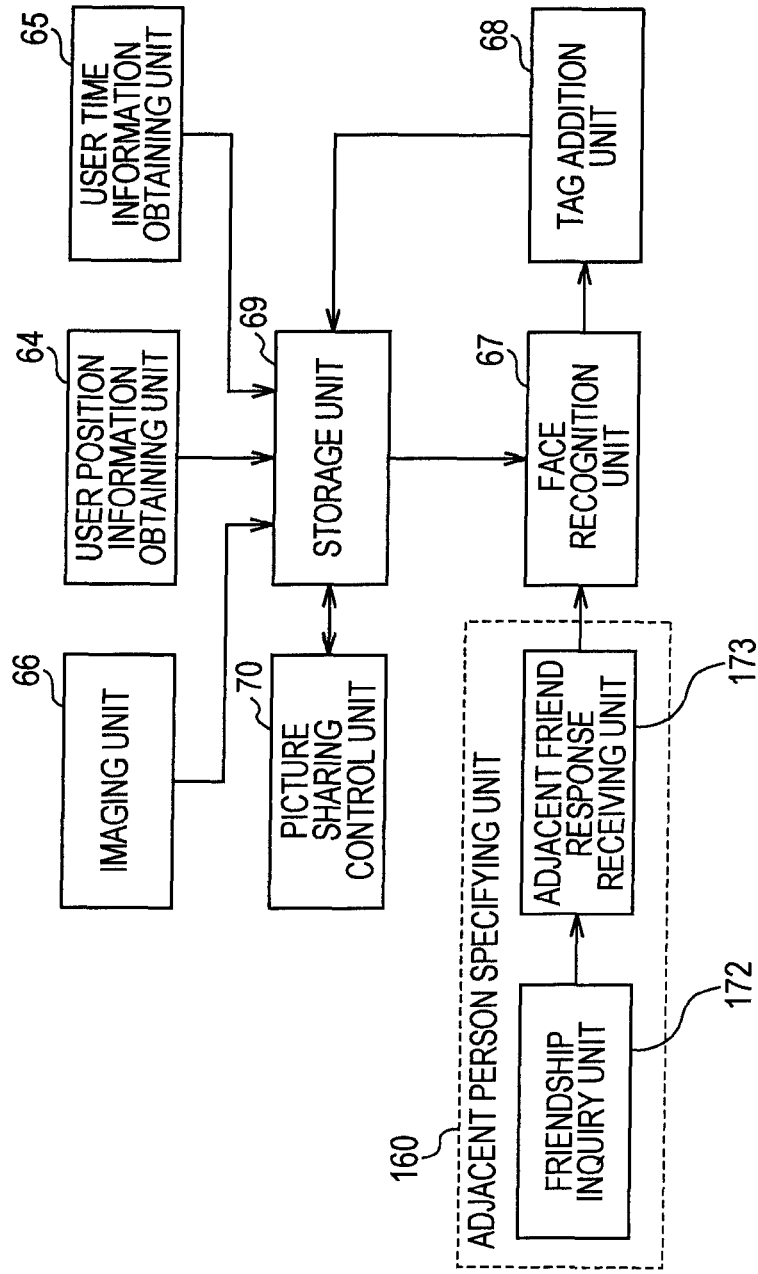
FIG. 19 is an outlined line block diagram showing a functional block configuration of a terminal of a person taking a picture according to the second embodiment.

Here, basic functions in relation to the adjacent person specifying processing in the terminal 110 of a person taking a picture is represented by a functional block diagram as in FIG. 19. In the functional block of the terminal 110 of a person taking a picture, an adjacent person specifying unit 160 is different from the adjacent person specifying unit 60 as compared with the terminal 10 of a person taking a picture (FIG. 8). In addition, the same reference numerals are added to the functional blocks corresponding to those in the first embodiment in FIG. 19 and FIG. 20, and the description thereof will be omitted.

In FIG. 19, adjacent person specifying unit 160 corresponds to the control unit 120 and the communication 23 (FIG. 15) and realizes each of the functional blocks of a friendship inquiry unit 172 and an adjacent friend response receiving unit 173 by a predetermined adjacent person specifying program executed in the control unit 120.

Figure 20:
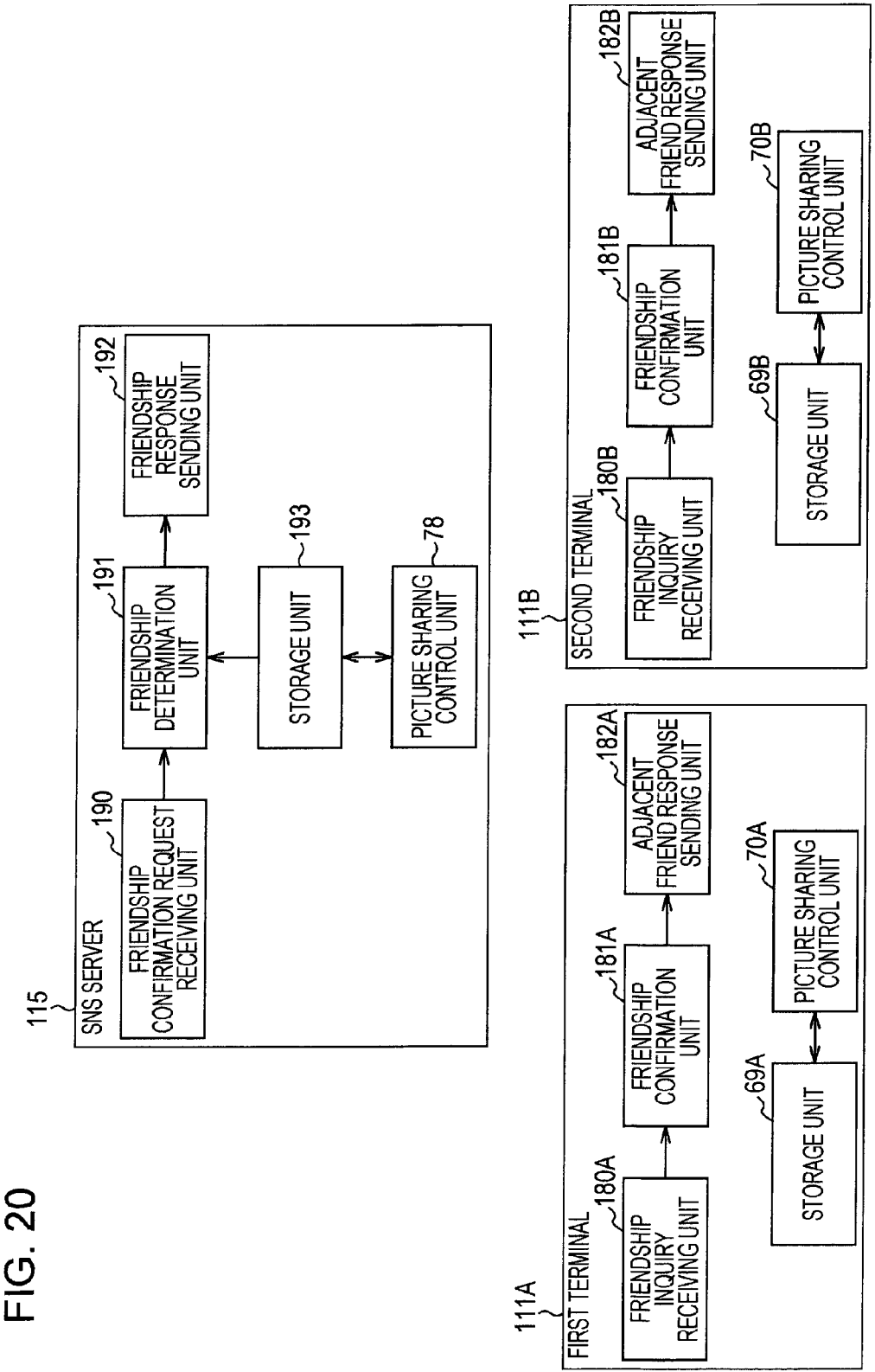
FIG. 20 is an outlined line block diagram showing functional block configurations of a first terminal, a second terminal, and an SNS server according to the second embodiment.

In addition, basic functions in relation to the adjacent person specifying processing in the first terminal 111A, the second terminal 111B, and the SNS server 115 are represented by a functional block diagrams as in FIG. 20.

In the first terminal 111A in FIG. 20, a friendship inquiry receiving unit 180A, a friendship confirmation unit 181A, and an adjacent friend response sending unit 182A correspond to the control unit 120 and the communication unit 23 in the first terminal 111A (FIG. 15).

In addition, in the second terminal 111B in FIG. 20, a friendship inquiry receiving unit 180B, a friendship confirmation unit 181B, and an adjacent friend response sending unit 182B correspond to the control unit 120 and the communication unit 23 in the second terminal 111B (FIG. 15).

Moreover, in the SNS server 115 in FIG. 20, a friendship confirmation request receiving unit 190, a friendship determination unit 191, and a friendship response sending unit 192 correspond to the control unit 140 and the communication unit 141 (FIG. 17), and a storage unit 193 corresponds to the friendship management DB 143, and the picture DB 144.

In Step SP31 in the adjacent person specifying processing procedure RT11 (FIG. 18), an imaging unit 66 of the first terminal 110 images an object, creates picture data, and causes the storage unit 69 to store the picture data.

In Step SP32, the friendship inquiry unit 172 performs a friendship inquiry for inquiring whether or not friends of the user UA are present near the terminal 110 of a person taking a picture.

Specifically, the friendship inquiry unit 172 transmits a signal indicating "SNS 1+SNS 1_UA" which is a combination of the SNS to which they belong and an account in SNS to which they belong as information indicating the terminal 110 of a person taking a picture to the terminals positioned around the terminal 110 of a person taking a picture. In addition, the friendship inquiry unit 172 transmits a signal for inquiring whether or not terminals of users belonging to the same SNS as the SNS to which they belong are present near the terminal 110 of a person taking a picture to the terminals positioned around the terminal 110 of a person taking a picture. In the embodiment, it is assumed that the first terminal 111A and the second terminal 111B are positioned near the terminal 110 of a person taking a picture.

In Step SP33, the friendship inquiry receiving unit 180A of the first terminal 111A receives a friendship inquiry from the terminal 110 of a person taking a picture. In addition, in Step SP34, friendship inquiry receiving unit 180B of the second terminal 111B receives a friendship inquiry from the terminal 110 of a person taking a picture.

The first terminal 111A, which has received the friendship inquiry from the terminal 110 of a person taking a picture, confirms with the friendship confirmation unit 181A that the user UA owning the terminal 110 of a person taking a picture is in a friendship with the user UB owning the first terminal 111A.

Specifically, in Step SP35, the friendship confirmation unit 181A transmits a friendship confirmation request for confirming whether or not the account SNS 1_UA is in a friendship with the account SNS 1_UB of the user UB in the SNS 1 to the SNS server 115 based on the signal representing the "SNS 1+SNS 1_UA" included in the received friendship inquiry.

Similarly, the second terminal 111B, which has been received the friendship inquiry from the terminal 110 of a person taking a picture, confirms with the friendship confirmation unit 181B whether or not the user UA owning the terminal 110 of a person taking a picture is in a friendship with the user UC owning the second terminal 111B.

In Step SP37, the friendship confirmation request receiving unit 190 of the SNS server 115 receives the friendship confirmation request from the first terminal 111A and the second terminal 111B.

In Step SP38, the friendship determination unit 191 determines whether or not the account SNS 1_UA and the account SNS 1_UB are in a friendship in the SNS 1 based on the friendship confirmation request received from the first terminal 111A with reference to the friendship management table TB1 (FIG. 5) stored on the storage unit 193.

In addition, the friendship determination unit 191 determines whether or not the account SNS 1_UA and the account SNS 1_UC are in a friendship in the SNS 1 based on the friendship confirmation request received from the second terminal 111B with reference to the friendship management table TB1 in the storage unit 193.

As described above, according to the second embodiment, the user UA and the user UB established a friendship in advance in the SNS 1 while the user UA and the user UC have not yet established a friendship in the SNS 1.

In Step SP39, the friendship response sending unit 192 transmits a friendship response representing that the account SNS 1_UA and the account SNS 1_UB (that is, the user UA and the user UB) are in a friendship in the SNS 1 to the first terminal 111A.

In addition, the friendship response sending unit 192 transmits a friendship response representing that the account SNS 1_UA and the account SNS 1_UC (that is, the user UA and the user UC) are not in a friendship in the SNS 1 to the second terminal 111B.

When the friendship confirmation unit 181A of the first terminal 111A receives the friendship response from the SNS server 115, adjacent friend response sending unit 182A transmits an adjacent friend response representing that the user UB as a friend of the user UA is present near the user UA to the terminal 110 of a person taking a picture in Step SP40.

On the other hand, the friendship confirmation unit 181B of the second terminal 111B receives the friendship response representing that the user UA and the user UC are not in a friendship. Since this means that the user UC currently positioned near the user UA is not in a friendship with the user UA, the adjacent friend response sending unit 182B does not transmits the adjacent friend response to the terminal 110 of a person taking a picture.

Since the first terminal 111A registers in advance in the SNS server 115 the friendships of the user UB owing the first terminal 111A, it is possible to easily confirm whether or not a user represented by the SNS to which they belong and an account shown in the received friendship inquiry is in a friendship with the user UB only by performing friendship confirmation with respect to the SNS server 115. The same is true for the second terminal 111B.

In Step SP41, the adjacent friend response receiving unit 173 of the terminal 110 of a person taking a picture receives the adjacent friend response from the first terminal 111A. In so doing, the terminal 110 of a person taking a picture can recognizes that the user UB, who owns the first terminal 111A and is in a friendship with the user UA in the SNS 1, is present near the user UA owning the terminal 110 of a person taking a picture.

In Step SP42, the face recognition unit 67 performs the same face recognition processing as that in the first embodiment. Subsequently, in Step SP43, the tag addition unit 68 performs tag addition to the picture data and causes the storage unit 69 to store the picture data. The tag addition unit 68 is configured to add a tag of the user UA, who created the picture data, as well to the picture data as the adjacent person information at this time.

In Step SP44, the picture sharing control unit 70 is configured to perform the same picture sharing processing as that in the first embodiment by transmitting the picture data to the SNS server 115.

In addition, the aforementioned terminal 110 of a person taking a picture, the first terminal 111A, the second terminal 111B, and the SNS server 115 preferably perform transmission after performing predetermined encryption when data communication is respectively performed. In so doing, it is possible to prevent impersonation and information divulging in the adjacent person specifying system 101.

2-4. Operations and Effects

In the above configuration, the terminal 110 of a person taking a picture as the adjacent person specifying apparatus images an object by an operation of the user UA as a user thereof, creates picture data as content by the imaging unit 66 as a content creating unit, and then stores the picture data on the storage unit 69.

Subsequently, the terminal 110 of a person taking a picture performs a friendship inquiry for inquiring whether or not other person terminals owned by persons in friendships with the user UA are present, with respect to the surrounding of the terminal 110 of a person taking a picture owned by the user UA.

The first terminal 111A, which has received the friendship inquiry, transmits a friendship confirmation request for confirming whether or not the user UA is in a friendship with the user UB to the SNS server 115 as another apparatus. Similarly, the second terminal 111B transmits a friendship confirmation request for confirming whether or not the user UA is in a friendship with the user UC to the SNS server 115.

When the friendship confirmation requests are received from the first terminal 111A and the second terminal 111B, the SNS server 115 refers to the friendship management table TB1 stored in advance on the storage unit 193 and determines the friendship between the user UA and the user UB and the friendship between the user UA and the user UC.

Subsequently, the SNS server 115 transmits friendship responses representing the determined friendships to the first terminal 111A and the second terminal 111B.

When the friendship response is received from the SNS server 115, the first terminal 111A transmits an adjacent friend response to the terminal 110 of a person taking a picture when the user UA as a user of the terminal 110 of a person taking a picture transmitting the friendship inquiry and the user UB owning the terminal itself are in a friendship. Similarly, the second terminal 111B also transmits an adjacent friend response to the terminal 110 of a person taking a picture when the user UA and the user UC owning the terminal itself are in a friendship.

As described above, according to the adjacent person specifying system 101, it is possible to specify friends who are currently present near the user UA only by transmitting a friendship inquiry to the surrounding terminals by an operation of the user UA owning the terminal 110 of a person taking a picture.

In addition, in the adjacent person specifying system 1 according to the aforementioned first embodiment, the first terminal 11A and the second terminal 11B are configured to periodically transmit position time information to the position sharing SNS server 12, and the position sharing SNS server 12 is configured to open mutual position information to the users among which friendships have been established.

Therefore, the positions of the user UB and the user UC are always opened to the users in friendships in the SNS 1 managed by the position sharing SNS server 12. Accordingly, there is a possibility that counterparts with whom friendships are established are focused to very limited counterparts in the adjacent person specifying system 1.

On the other hand, according to the adjacent person specifying system 101 of this embodiment, the first terminal 111A and the second terminal 111B can transmit adjacent friend responses with respect to a friendship inquiry to the terminal 110 of a person taking a picture only by confirming the friendships in the SNS server 115 when the friendship inquiry is received from the terminal 110 of a person taking a picture.

Therefore, the users UB and UC can allow the terminal 110 of a person taking a picture owned by the user UA to recognize that they are present nearby without narrowly limiting friendships.

In addition, the terminal 110 of a person taking a picture is configured to perform the face recognition processing as in the same manner as the terminal 10 of a person taking a picture according to the first embodiment. In so doing, the terminal 110 of a person taking a picture can specify a person who does not belong to the same SNS as that to which the user UA belongs and a person who owns a terminal which cannot respond to the friendship inquiry due to poor reception when ad hoc communication is performed.

In addition, since the terminal 110 of a person taking a picture specifies terminals owned by adjacent persons using ad hoc communication, it is not necessary to obtain position information and time information, and it is possible to omit the position and time obtaining unit 28 as compared with the terminal 10 of a person taking a picture (FIG. 2) according to the first embodiment.

In addition, since the adjacent person specifying system 101 performs the adjacent person specifying processing without using the position time information of the first terminal 111A and the second terminal 111B, it is not necessary to provide the location DB 42 in the SNS server 115, and it is possible to simplify the configuration.

As for other points, the adjacent person specifying system 101 can achieve the same function effects as those in the first embodiment.

According to the above configuration, the terminal 110 of a person taking a picture is configured to specify other persons, who are present near the user UA when content is created, in friendships with the user UA by performing a friendship inquiry with respect to the other person terminals owned by other persons who are present near the user UA when the content is created by the user UA and receiving friendship responses representing that the other persons are in friendships with the user UA from the other person terminals.

In so doing, the terminal 110 of a person taking a picture can specify other users who were present near the user UA when the content was created only by inquiring whether or not friends are present to the surrounding without forcing the user to perform a complicated operation and without holding position information of other terminals. Thus, according to the adjacent person specifying system 101, it is possible to allow creation of content with useful information added thereto with a simple operation.

3. Third Embodiment 3-1. Configurations of Adjacent Person Specifying System, Terminal of Person Taking Picture, and Position Sharing SNS Server As shown in FIG. 1, an adjacent person specifying system 201 according to a third embodiment is configured by a terminal 210 of a person taking a picture, a first terminal 211A, a second terminal 211B, and a position sharing SNS server 212.

As shown in FIG. 2, the terminal 210 of a person taking a picture, the first terminal 211A, and the second terminal 211B are different from the terminal 10 of a person taking a picture, the first terminal 11A, and the second terminal 11B according to the first embodiment in the CPU 220A configuring the control unit 220 and a program stored on the ROM 220B.

As shown in FIG. 4, in the position sharing SNS server 212, a control unit 240 who controls the whole is different as compared with the position sharing SNS server 12.

3-2. Adjacent Person Specifying Processing Procedure

Figure 21:
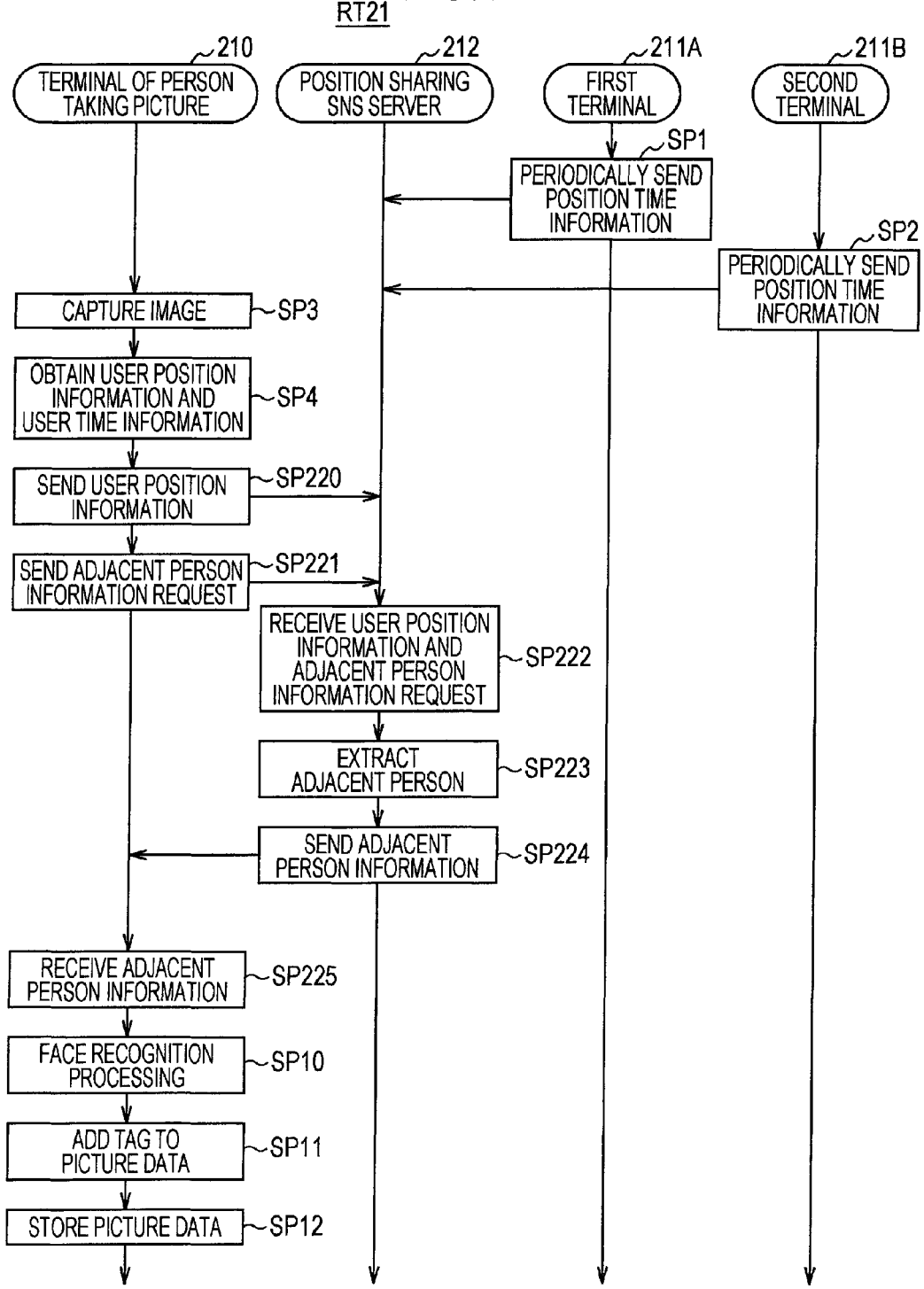
FIG. 21 is a sequence chart showing an adjacent person specifying processing procedure according to the third embodiment.

Next, description will be given of an adjacent person specifying processing procedure RT21 according to the third embodiment with the use of a sequence chart shown in FIG. 21. Although the adjacent person extracting processing is performed in the terminal 10 of a person taking a picture in the aforementioned adjacent person specifying processing procedure RT1, the adjacent person extracting processing is performed in the position sharing SNS server 212 in the adjacent person specifying processing procedure RT21 according to this embodiment. In addition, the same processing as that in the adjacent person specifying processing procedure RT1 is represented by the same reference numerals in the adjacent person specifying processing procedure RT21, and the description thereof will be omitted.

Figure 22:
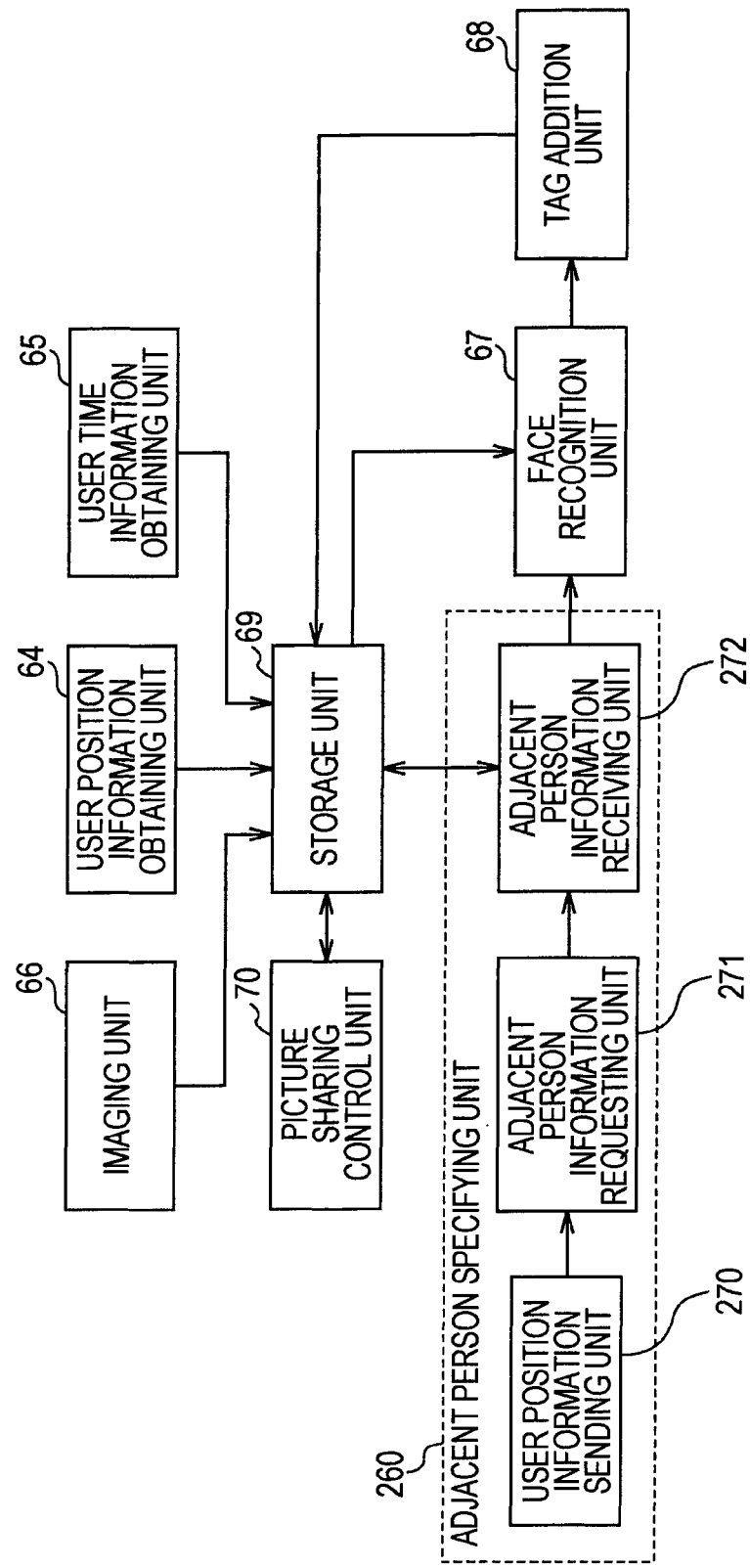
FIG. 22 is an outlined line block diagram showing a functional block configuration of a terminal of a person taking a picture according to the third embodiment.

Here, basic functions in relation to the adjacent person specifying processing in the terminal 210 of a person taking a picture is represented by a functional block diagram as in FIG. 22.

In FIG. 22, adjacent person specifying unit 260 corresponds to the control unit 220 and the communication unit 23 (FIG. 2) and realizes each of the functional blocks of the user position information sending unit 270, the adjacent person information requesting unit 271, and the adjacent person information requesting unit 272 by a predetermined adjacent person specifying program executed in the control unit 220.

Figure 23:
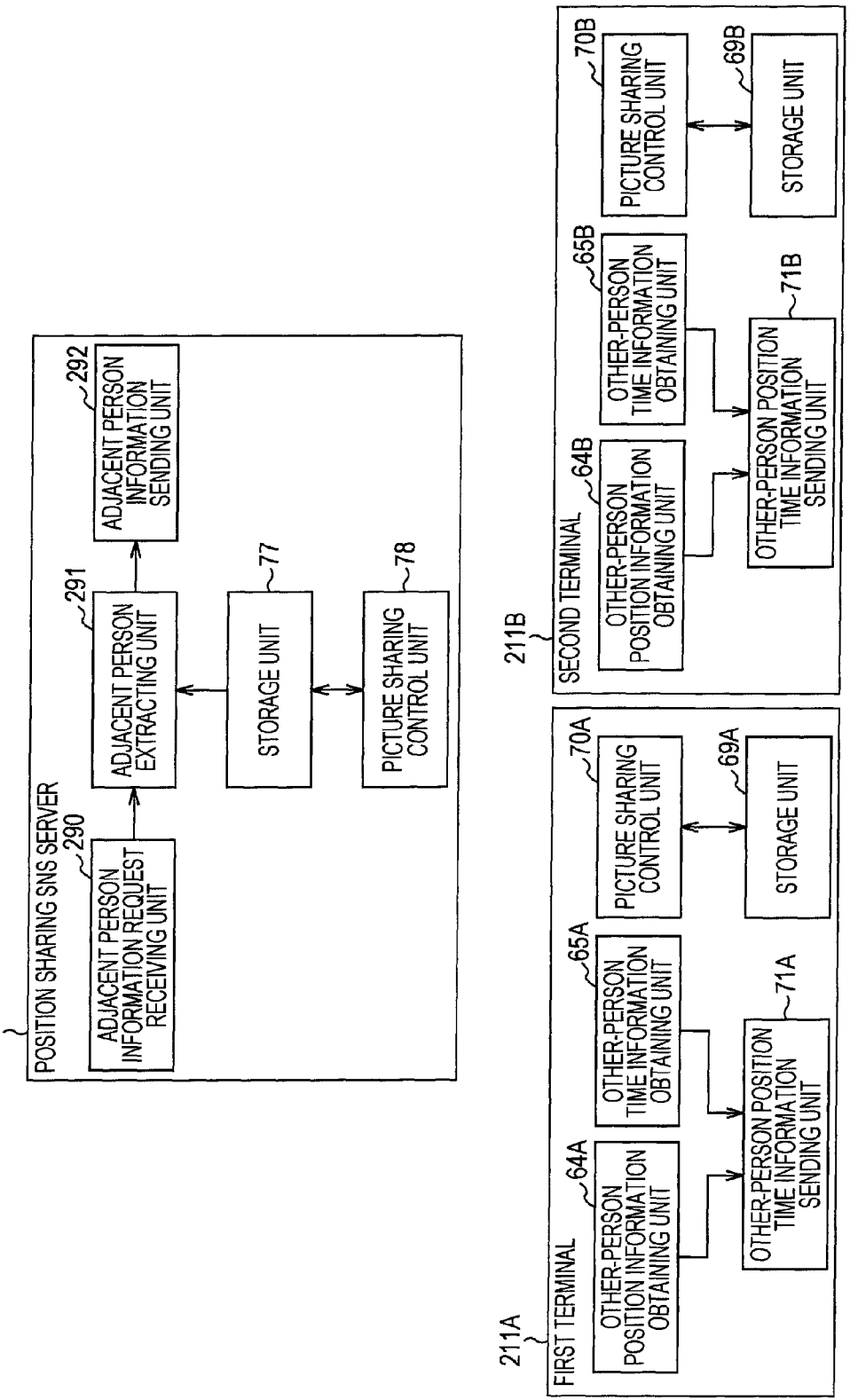
FIG. 23 is an outlined line block diagram showing functional block configurations of a first terminal, a second terminal, and a position sharing SNS server according to the third embodiment.

In addition, basic functions in relation to the adjacent person specifying processing in the first terminal 211A, the second terminal 211B, and the position sharing SNS server 212 are represented by functional block diagrams as in FIG. 23. The first terminal 211A and the second terminal 211B are the same functional blocks as the first terminal 11A and the second terminal 11B (FIG. 9) in the first embodiment.

In the position sharing SNS server 212, an adjacent person information request receiving unit 290 and an adjacent person information sending unit 292 correspond to the control unit 240 and the communication unit 41 (FIG. 4), and an adjacent person extracting unit 291 corresponds to the control unit 240, respectively. The storage unit 77 and the picture sharing control unit 78 are configured in the same manner as the position sharing SNS server 12.

The same processing as the aforementioned adjacent person specifying processing procedure RT1 (FIG. 7) is performed in Steps SP1 to SP4 in the adjacent person specifying processing procedure RT21 (FIG. 21), and the user position information sending unit 270 transmits the user position information obtained in Step SP4 to the position sharing SNS server 212 in Step SP220.

In Step SP221, the adjacent person information requesting unit 271 transmits an adjacent person information request for requesting adjacent person information indicating other users who belong to the SNS1 and are present near the user UA to the position sharing SNS server 212.

In Step SP222, the adjacent person information request receiving unit 290 of the position sharing SNS server 212 receives the user position information and the adjacent person information request from the terminal 210 of a person taking a picture.

In Step SP223, the adjacent person extracting unit 291 compares the received user position information of the user UA with the latest position information of a plurality of users described in the storage unit 77 and extracts users (adjacent persons) who are close to the position indicated by the user position information of the user UA.

In Step SP224, the adjacent person information sending unit 292 transmits adjacent person information indicating the adjacent persons extracted in Step SP223 to the terminal 210 of a person taking a picture.

In Step SP225, the adjacent person information requesting unit 272 of the terminal 210 of a person taking a picture receives the adjacent person information from the position sharing SNS server 212.

Figure 7:
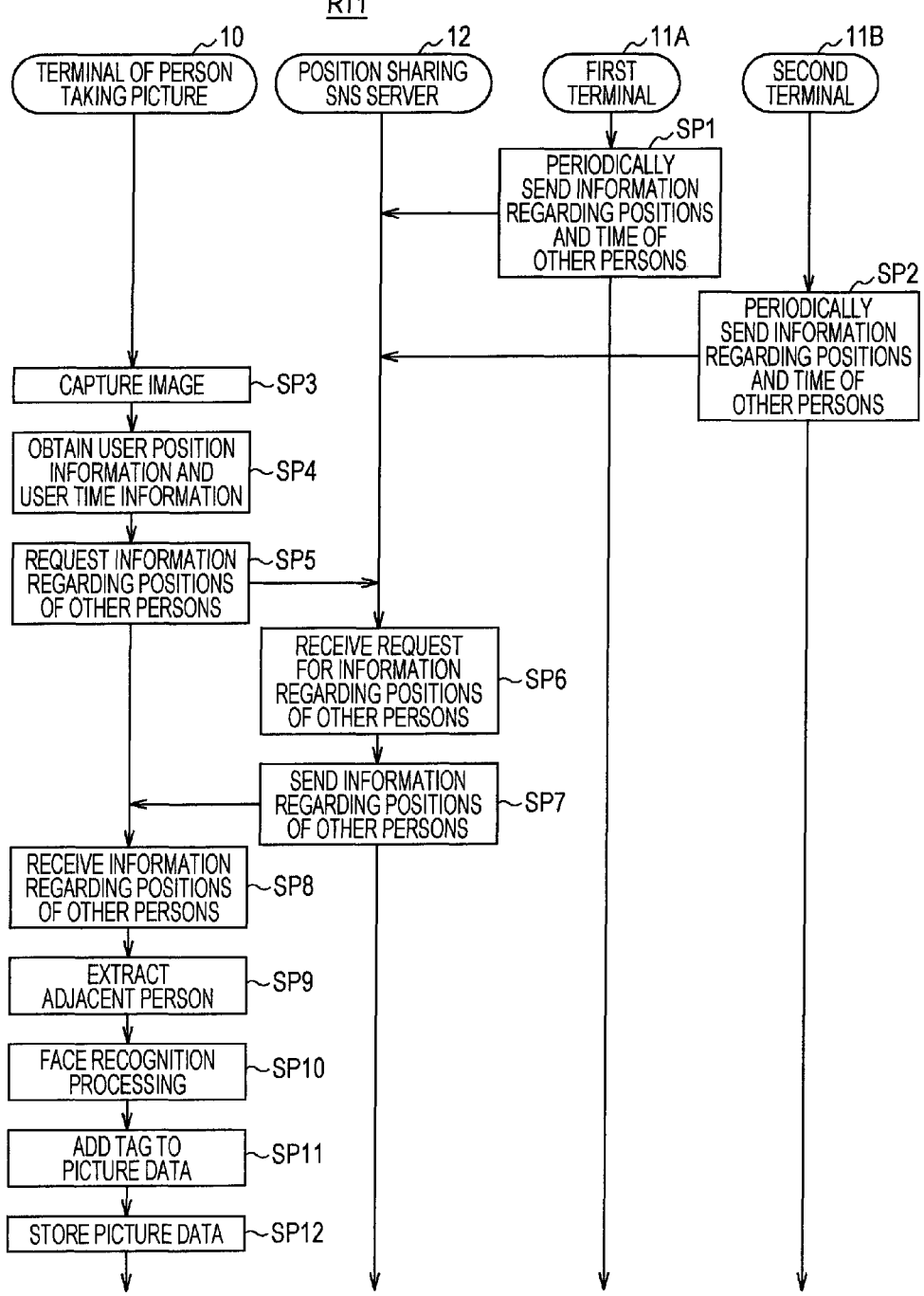
FIG. 7 is a sequence chart showing an adjacent person specifying processing procedure according to the first embodiment.

In Steps SP10 to SP12, the terminal 210 of a person taking a picture performs the same processing as the adjacent person specifying processing procedure RT1 (FIG. 7).

3-3. Operations and Effects

In the above configuration, the terminal 210 of a person taking a picture as the adjacent person specifying apparatus images an object by an operation of the user UA as a user and creates picture data as content in the imaging unit 66 as a content creating unit. Subsequently, the terminal 210 of a person taking a picture obtains user position information indicating the position information of the user UA and the user time information indicating the time information when the picture data is created, adds the information to the picture data, and stores the picture data on the storage unit 69.

Subsequently, the terminal 210 of a person taking a picture transmits an adjacent person information request for requesting adjacent person information indicating other users who belong to the SNS 1 and are present near the user UA and the user position information to the position sharing SNS server 212 as another apparatus.

The position sharing SNS server 212 compares the received user position information of the user UA with the latest other-person position information of a plurality of users described in the storage unit 77, extracts users who are close to a position indicated by the user position information of the user UA, and transmits adjacent person information to the user UA.

In so doing, the terminal 210 of a person taking a picture can specify adjacent persons only by transmitting an adjacent person information request as well as the user position information of the user UA to the position sharing SNS server 212 and receiving adjacent person information. Therefore, the terminal 210 of a person taking a picture can reduce processing in the terminal 210 of a person taking a picture with no need to extract adjacent persons.

In addition, as for other points, the adjacent person specifying system 201 can achieve the same function effects as those in the first embodiment.

According to the above configuration, the terminal 210 of a person taking a picture obtains the user position information of the user UA when the content is created by the user UA and transmits the user position information with the adjacent person information request to the position sharing SNS server 212. The position sharing SNS server 212 extracts other users who were present near the user UA when the content was created based on the user position information of the user UA and the latest other-person position information of the users UB and UC stored on the storage unit 77 and transmits adjacent person information to the terminal 210 of a person taking a picture.

In so doing, the terminal 210 of a person taking a picture can specify other users who were present near the user UA when the content was created only by using position information of other terminals stored on the position sharing SNS server 212 without forcing the user to perform a complicated operation and without holding the position information of other terminals. Thus, according to the adjacent person specifying system 201, it is possible to allow creation of content with useful information added thereto with a simple operation.

4. Fourth Embodiment

In the adjacent person specifying system 1 (FIG. 1) according to the aforementioned first embodiment, other-person position information is received from the position sharing SNS server 12 by transmitting an other-person position request to the position sharing SNS server 12 after imaging by the terminal 10 of a person taking a picture.

On the other hand, the adjacent person specifying system 301 according to a fourth embodiment is configured such that the position sharing SNS server 12 is periodically and continuously transmitting the other-person position information to the terminal 10 of a person taking a picture. In this embodiment, the terminal 10 of a person taking a picture stores the periodically received other-person position information on the storage unit 31 (FIG. 2) and performs adjacent person extraction based on the other-person position information.

As described above, since the terminal 10 of a person taking a picture can periodically receive the other position information from the position sharing SNS server 12 in this embodiment, it is not necessary to send an other-person position information request to the position sharing SNS server 12 every time imaging is performed, and it is possible to reduce processing burden.

5. Fifth Embodiment

In the adjacent person specifying system 1 (FIG. 1) according to the aforementioned first embodiment, the adjacent person specifying processing and the face recognition processing are performed immediately after the terminal 10 of a person taking a picture performs imaging.

On the other hand, in an adjacent person specifying system 401 according to a fifth embodiment, the adjacent person specifying processing is performed when picture data imaged by the terminal 10 of a person taking a picture and stored on the storage unit 31 (FIG. 2) is organized or searched for later by a user's operation.

If desired picture data is selected as a target of the adjacent person specifying processing by a user's operation among the picture data stored on the storage unit 31, the terminal 10 of a person taking a picture transmits an other-person position information request with user time information added to the picture data selected as the target of the adjacent person specifying processing to the position sharing SNS server 12.

The position sharing SNS server 12 extracts location information with which time closest to the user time information received from the terminal 10 of a person taking a picture has been associated for each terminal among location information of other terminals accumulated in the location table TB2 (FIG. 6), associates the other-person position information in the extracted location information with accounts, and transmits the other-person position information to the terminal of a person taking a picture.

The terminal 10 of a person taking a picture, which has received the other-person position information, performs the adjacent person specifying processing by comparing the user position information of the processing target picture data with the position information of other terminals described in the other-person position information.

Thereafter, the terminal 10 of a person taking a picture performs the aforementioned face recognition processing on the picture data on which the adjacent person specifying processing has been performed and stores the picture data again on the storage unit 31.

As described above, the adjacent person specifying system 401 of this embodiment can perform the adjacent person specifying processing not only immediately after imaging but also at timing which the user desires, with the use of the user time information added to the picture data and the other person time information accumulated in the location table TB2.

6. Sixth Embodiment

In the adjacent person specifying system 1 (FIG. 1) according to the aforementioned first embodiment, the adjacent person specifying processing and the face recognition processing are performed immediately after the terminal 10 of a person taking a picture performs imaging.

On the other hand, in an adjacent person specifying system 501 according to a sixth embodiment, the adjacent person specifying processing is performed immediately after the terminal 10 of a person taking a picture (FIG. 2) performs imaging, tag addition is performed, and the storage unit 31 is caused to once store the data. Thereafter, the terminal 10 of a person taking a picture is configured to read the picture data from the storage unit 31, performs the face recognition processing, then performs tag addition again, and causes the storage unit 31 to store the data again when organizing of pictures is performed on the picture data stored on the storage unit 31 by a user's operation.

7. Seventh Embodiment

In the adjacent person specifying system 201 (FIG. 1) according to the aforementioned third embodiment, the adjacent person extracting processing is performed in the position sharing SNS server 212 immediately after the terminal 210 of a person taking a picture performs imaging.

On the other hand, in an adjacent person specifying system 601 according to a seventh embodiment, the position sharing SNS server 212 executes adjacent person extracting processing on the picture data after the terminal 210 of a person taking a picture (FIG. 2) performs imaging, then executes picture sharing processing on the picture data stored on the storage unit 31 by a user's operation, and transmits the picture data to the position sharing SNS server 212 (FIG. 1).

The position sharing SNS server 212 is configured to transmit a picture sharing notification of the picture data to the terminals owned by users whose tags have been added, after performing the adjacent person extracting processing and the tag addition on the transmitted picture data.

8. Eighth Embodiment

In the adjacent person specifying system 1 (FIG. 8) according to the aforementioned first embodiment, the terminal 10 of a person taking a picture has the imaging unit 66, the imaging unit 66 of the terminal 10 of a person taking a picture performs imaging, and the adjacent person specifying unit 60 performs adjacent person specifying processing.

Figure 24:
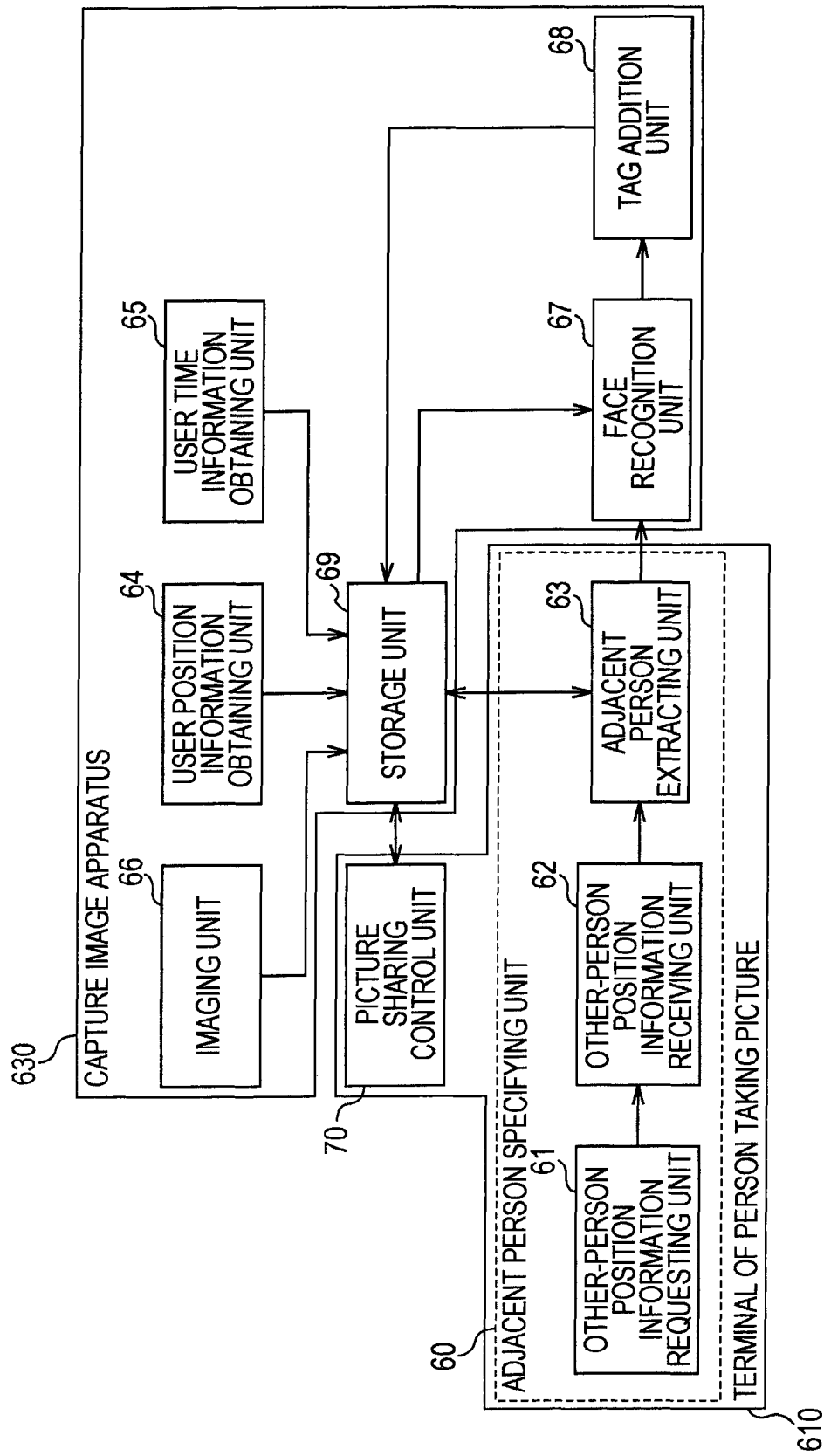
FIG. 24 is an outlined line block diagram showing functional block configurations of a terminal of a person taking a picture and an imaging apparatus according to the eighth embodiment.

On the other hand, in an adjacent person specifying system 701 (FIG. 1) according to an eighth embodiment, as in the functional blocks shown in FIG. 24, the imaging unit 66 is not provided in the terminal 610 of a person taking a picture, an imaging apparatus 630 for performing imaging is separately provided from the terminal 610 of a person taking a picture. The user owns the terminal 610 with which a person is taking a picture and the imaging apparatus 630.

The terminal 610 of a person taking a picture and the imaging apparatus 630 are configured to be able to communicate data by a predetermined communication means which is not shown in the drawing. When the imaging unit 66 of the imaging apparatus 630 performs imaging, the imaging apparatus 630 performs data communication with the terminal 610 of a person taking a picture, obtains adjacent person information, performs face recognition processing in the face recognition unit 67, performs tag addition in the tag addition unit 68, and stores picture data on the storage unit 69.

Therefore, even the imaging apparatus 630 which has an imaging function but does not perform the adjacent person specifying processing can obtain adjacent person information by causing the terminal 610 of a person taking a picture to perform the adjacent person specifying processing.

9. Ninth Embodiment

In the adjacent person specifying system 101 (FIG. 14) according to the aforementioned second embodiment, the terminal 110 of a person taking a picture transmits a friendship inquiry to nearby terminals, and the other terminals which have received the friendship inquiry perform friendship confirmation with respect to the SNS server 115.

On the other hand, in an adjacent person specifying system 801 according to a ninth embodiment, the SNS server 115 has information of terminal IDs such as MAC addresses or the like, for example, each of which is a unique ID to the terminal owned by each person, in association with the information of each person in the friendship management table TB1 (FIG. 5).

When the friendship inquiry is received from the terminal 110 of a person taking a picture, the first terminal 111A and the second terminal 111B respectively reply their own terminal IDs to the terminal 110 of the person taking a picture.

The terminal 110 of a person taking a picture, which has received the respective terminal IDs from the first terminal 111A and the second terminal 111B, inquires whether or not users owning terminals indicated by the received terminal IDs and the user owning the terminal 110 of a person taking a picture are in friendships by transmitting a plurality of received terminal IDs and the terminal ID of the terminal 110 of a person taking a picture to the SNS server 115.

The SNS server 115 refers to the friendship management table TB1, determines whether or not the users owning the terminals indicated by the terminal IDs received by the terminal 110 of a person taking a picture and the user owning the terminal 110 of a person taking a picture are in friendships, and transmits determination results to the terminal 110 of a person taking a picture.

As described above, in the adjacent person specifying system 801 according to this embodiment, the SNS server 115 is configured to store the terminal ID of the terminal owned by the user in association with the user. Therefore, all other terminals have to do is to reply their own terminal IDs in response to the friendship inquiry from the terminal 110 of a person taking a picture without performing an inquiry to the SNS server 115 when a friendship inquiry is received from the terminal 110 of a person taking a picture.

10. Tenth Embodiment

In the adjacent person specifying system 101 (FIG. 14) according to the aforementioned second embodiment, the terminal 110 of a person taking a picture is configured to transmit a signal in which a belonging SNS and an account in the belonging SNS are combined as a friendship inquiry.

On the other hand, in an adjacent person specifying system 901 according to a tenth embodiment, the terminal 110 of a person taking a picture is configured to transmit a terminal ID such as a MAC address or the like, for example, which is an ID unique to each terminal.

The first terminal 111A (FIG. 15) according to this embodiment stores terminal IDs of terminals owned by users who are in friendships with the user UB in advance on the storage unit 31. Similarly, the second terminal 111B also stores terminal IDs of terminals owned by users who are in friendships with the user UC in advance on the storage unit 31.

When the terminal ID of the terminal 110 of a person taking a picture is received at this time, the first terminal 111A and the second terminal 111B confirms whether or not the terminal ID has already been stored on the storage unit 31.

When the received terminal ID has already been stored on the storage unit 31, the first terminal 111A determines that the user UB and the user UA are in a friendship and transmits an adjacent friend response to the terminal 110 of a person taking a picture. In addition, when the received terminal ID has already been stored on the storage unit 31, the second terminal 111B determines that the user UC and the user UA are in a friendship and transmits an adjacent friend response to the terminal 110 of a person taking a picture.

As described above, since the terminal ID of the terminal 110 of a person taking a picture is stored in advance on other terminals in the adjacent person specifying system 901 according to the embodiment, other terminal can transmit the adjacent person responses to the terminal 110 of a person taking a picture with no need to confirm friendships with respect to the SNS server 115.

11. Other Embodiments

In the aforementioned second embodiment, the description was given of a case in which terminal 110 of a person taking a picture transmitted a signal indicating "SNS 1+SNS 1_UA" which is a combination between a belonging SNS and an account in the belonging SNS to terminals to the surrounding terminals, as a friendship inquiry.

The present technique is not limited thereto, and terminal 110 of a person taking a picture may transmit a signal "SNS 1+GRP 1" which is a combination between a SNS to which they belong and a group to which they belong in the SNS to which they belong, for example to the surrounding terminals. In such a case, the terminal 110 of a person taking a picture can inquire whether or not terminals owned by users who belong to the SNS 1 and belong to a group GRP 1 are present nearby.

In addition, according to the aforementioned second embodiment, the description was given of a case in which a signal which is a combination between one belonging SNS and an account in the belonging SNS was transmitted, as a friendship inquiry.

The present technique is not limited thereto, and a signal which is a combination of a plurality of belonging SNSs and each of the accounts in the belonging SNSs may be transmitted.

Moreover, in the aforementioned embodiments, the description was given of a case in which tag addition is performed by embedding adjacent person information into picture data. The present technique is not limited thereto, and adjacent person information may be stored as a separate file from the picture data while the separate file is associated with the picture data.

Furthermore, although the description was given of a case in which the face recognition processing is performed on picture data in the aforementioned embodiments, the present technique is not limited thereto, and the face recognition processing may also be executed on moving image data as image content. In addition, precision in adjacent person specification when sound content is created may be enhanced by executing predetermined sound recognition processing on moving image data as sound content or sound content.

Furthermore, although the description was given of a case in which the picture DB 44 was provided in the position sharing SNS server 12 while the picture DB 144 was provided in the SNS server 115 in the aforementioned embodiments, the present technique is not limited thereto, and they may be provided in a server which are different from the position sharing SNS server 12 and the SNS server 115. In addition, as well as providing the picture DB 44 in a different server, picture sharing processing itself may be executed by the server other than the position sharing SNS server 12 and the SNS server 115.

Furthermore, in the aforementioned embodiments, the description was given of a case in which the terminal 10 of a person taking a picture as the adjacent person specifying apparatus was configured by the user position information obtaining unit 64 as a user position information obtaining unit, the other-person position information receiving unit 62 as an other-person position information receiving unit, and the adjacent person extracting unit 63 as an adjacent person extracting unit.

The present disclosure is not limited thereto, and an adjacent person specifying apparatus may be configured by a user position information obtaining unit, an other-person position information receiving unit, and an adjacent person extracting unit with other various configurations.

In addition, in the aforementioned embodiments, the description was given of a case in which the adjacent person specifying system 201 as the adjacent person specifying system was configured by the user position information obtaining unit 64 as a user position information obtaining unit, the user position information sending unit 270 as a user position information sending unit, the adjacent person information requesting unit 271 as an adjacent person information requesting unit, the adjacent person information receiving unit 272 as an adjacent person information receiving unit, the adjacent person information request receiving unit 290 as an adjacent person information request receiving unit, the adjacent person extracting unit 291 as an adjacent person extracting unit, and the adjacent person information sending unit 292 as an adjacent person information sending unit.

The present technique is not limited thereto, and an adjacent person specifying system may be configured by a user position information obtaining unit, a user position information sending unit, an adjacent person information requesting unit, an adjacent person information receiving unit, an adjacent person information request receiving unit, an adjacent person extracting unit, and an adjacent person information sending unit with other various configurations.

Furthermore, the present technique can employ the following configurations.

(1) An information processing apparatus comprising:
a processor that
obtains content data and first position information corresponding to the content data;
obtains second position information corresponding to a second person having a predetermined relationship with a first person associated with creating the content data; and
associates identification corresponding to the second person with the content data based on a predetermined relationship between the first position information and the second position information.

(2) The information processing apparatus described in (1), further comprising:
an image capturing unit that captures image data as the obtained content data.

(3) The information processing apparatus described in (1) or (2), further comprising:
a sound capturing unit that captures sound data as the obtained content data.

(4) The information processing apparatus described in any of (1) to (3), further comprising:
a position obtaining unit that calculates the first position information corresponding to the content data.

(5) The information processing apparatus described in (1) or (4), wherein the position obtaining unit calculates a time associated with the first position information.

(6) The information processing apparatus described in any of (1), (4) or (5), wherein the position obtaining unit calculates the first position information based on a signal received from another information processing apparatus.

(7) The information processing apparatus described in any of (1) to (4), further comprising:
an interface, wherein the controller controls the interface to transmit the content data and the first position information to another information processing apparatus.

(8) The information processing apparatus described in any of (1) to (4), or (7), further comprising:
an interface that receives, from another information processing apparatus, the second position information corresponding to the second person.

(9) The information processing apparatus described in any of (1) to (4), (7) or (8), wherein the processor determines a difference between the first position information and the second position information and associates the identification information corresponding to the second person with the content data when the difference is less than a predetermined threshold value.

(10) The information processing apparatus described in any of (1) to (4) or (7) to (9), wherein the processor associates the identification information corresponding to the second person with the content by adding the identification information corresponding to the second person to a file including the content data.

(11) The information processing apparatus described in any of (1) to (4) or (7) to (10), wherein the processor performs facial recognition on the content data to detect an image of a third person included in the content data.

(12) The information processing apparatus described in (1) or (11), wherein the processor associates identification information corresponding to the third person with the content when the facial recognition detects the image of the third person in the content data.

(13) The information processing apparatus described in any of (1), (11) or (12), wherein the processor obtains and performs facial recognition on a plurality of pieces of temporally related content data to detect the image of the third person included in the content data.

(14) The information processing apparatus described in any of (1), (11) or (13), wherein the processor associates identification information corresponding to the third person with each of the plurality of pieces of temporally related content data in which the image of the third person is detected.

(15) The information processing apparatus described in any of (1), (11), (13) or (14), wherein the processor determines that the identification information corresponding to the third person is not associated with a piece of the plurality of pieces of temporally related content data, and associates the identification information corresponding to the third person to the piece of the plurality of pieces of temporally related content data.

(16) The information processing apparatus described in any of (1) to (4) or (7) to (11), further comprising:
an interface, wherein the interface is controlled by the processor to transmit a notification to a terminal associated with the second person when the identification information corresponding to the second person is associated with the content data.

(17) The information processing apparatus described in (1) or (16), wherein the interface receives a request from the terminal associated with the second person for the content, and the processor controls the interface to transmit the content data to the terminal associated with the second person.

(18) An information processing method performed by an information processing apparatus, the method comprising:
obtaining, by a processor of the information processing apparatus, content data and first position information corresponding to the content data;
obtaining, by the processor, second position information corresponding to a second person having a predetermined relationship with a first person associated with creating the content data; and
associating, by the processor, identification corresponding to the second person with the content data based on a predetermined relationship between the first position information and the second position information.

(19) A non-transitory computer-readable medium including computer program instructions, which when executed by an information processing apparatus, cause the information processing apparatus to perform a method comprising:
obtaining content data and first position information corresponding to the content data;
obtaining second position information corresponding to a second person having a predetermined relationship with a first person associated with creating the content data; and
associating identification corresponding to the second person with the content data based on a predetermined relationship between the first position information and the second position information.

(20) An information processing system comprising:
a first information processing apparatus that obtains content data and first position information corresponding to the content data, and transmits a request including the first position information to a second information processing apparatus; and
the second information processing apparatus that, in response to the request, obtains second position information corresponding to a second person having a predetermined relationship with a first person associated with creating the content data, and transmits the second position information to the first information processing apparatus, wherein
the first information processing apparatus associates identification corresponding to the second person with the content data based on a predetermined relationship between the first position information and the second position information.

(21) An adjacent person specifying apparatus including: a user position information obtaining unit which obtains position information of a user when content was created by the user; an other-person position information receiving unit which receives position information of other persons stored on another apparatus and obtained from terminals owned by the other persons from the another apparatus; and an adjacent person extracting unit which extracts the other persons, who were present near the user when the content was created, based on the position information of the user and the position information of the other persons.

(22) The adjacent person specifying apparatus according to above (21), further including a face recognition unit which executes face recognition processing on the content of an imaged object and specifies the object of the content as a result of the face recognition processing.

(23) The adjacent person specifying apparatus according to above (21) or (22), further including a tag addition unit which associates information indicating the other persons who were present near the user when the content was created with the content.

(24) The adjacent person specifying apparatus according to above (23), wherein the tag addition unit associates the information indicating the other persons, which has been associated with one piece of content among a plurality of pieces of content, with content which meets a predetermined criteria among the plurality of pieces of content.

(25) The adjacent person specifying apparatus according to above (24), wherein the tag addition unit associates the information indicating the other persons, which has been associated with the one piece of content among the plurality of pieces of content, with another piece of content at time and a position which are close to those when the one piece of content was created.

(26) The adjacent person specifying apparatus according to any one of above (23) to (26), wherein the another apparatus includes a content receiving unit which receives the content, with which the information indicating the other persons has been associated, from the adjacent person specifying apparatus, and a picture sharing notification sending unit which sends a picture sharing notification, which indicates that the content created when the other persons were present nearby can be shared, to the other persons indicated by the information indicating the other persons.

(27) The adjacent person specifying apparatus according to any one of above (21) to (26), further including a content creation unit which creates the content.

(28) The adjacent person specifying apparatus according to above (27), wherein the content creation unit is an imaging unit which records a stationary image or a moving image.

(29) The adjacent person specifying apparatus according to above (27), wherein the content creation unit is a microphone which records sound.

(30) The adjacent person specifying apparatus according to any one of above (31) to (29), wherein the user position information obtaining unit obtains the position information of the user by a GPS (Global Positioning System).

(31) The adjacent person specifying apparatus according to any one of above (21) to (30), wherein the user position information obtaining unit obtains the position information of the user based on a signal of a base station.

(32) The adjacent person specifying apparatus according to any one of above (21) to (31), further including a user position information sending unit which sends the position information of the user to the another apparatus, wherein an open range of the position information of the user is set with respect to the another apparatus for each service.

INDUSTRIAL APPLICABILITY

The present technique can be used for a digital camera, a digital video camera, a digital audio recorder, a mobile phone, a computer device, a mobile music player, a mobile media player, a mobile game player, and the like which record content created by users.

REFERENCE SIGNS LIST 1, 101, 201, 301, 401, 501, 601, 701, 801, 901 ADJACENT PERSON SPECIFYING SYSTEM
10, 110, 210 TERMINAL OF PERSON TAKING PICTURE
11A, 111A, 211A FIRST TERMINAL
11B, 111B, 211B SECOND TERMINAL
12, 212 POSITION SHARING SNS SERVER
20, 120, 220 CONTROL UNIT
20A, 120A, 220A CPU
20B, 120B, 220B ROM
20C, 220C RAM
21 BUS
22 OPERATION UNIT
23 COMMUNICATION UNIT
24 DECODER
25 SPEAKER
26 MICROPHONE
27 ENCODER
28 POSITION TIME OBTAINING UNIT
29 IMAGING UNIT
30 DISPLAY UNIT
31 STORAGE UNIT
40, 140, 240 CONTROL UNIT
41, 141 COMMUNICATION UNIT LOCATION DB
43, 143 FRIENDSHIP MANAGEMENT DB
44, 144 PICTURE DB
60, 160, 260 ADJACENT PERSON SPECIFYING UNIT
61 OTHER-PERSON POSITION INFORMATION REQUESTING UNIT
62 OTHER-PERSON POSITION INFORMATION RECEIVING UNIT
63 ADJACENT PERSON EXTRACTING UNIT
64 USER POSITION INFORMATION OBTAINING UNIT
64A, 64B OTHER-PERSON POSITION INFORMATION OBTAINING UNIT
65 USER TIME INFORMATION OBTAINING UNIT
65A, 65B OTHER PERSON TIME INFORMATION OBTAINING UNIT
66 IMAGING UNIT
67 FACE RECOGNITION UNIT
68 TAG ADDITION UNIT
69, 69A, 69B STORAGE UNIT
70, 70A, 70B, 78 PICTURE SHARING CONTROL UNIT
71A, 71B OTHER-PERSON POSITION TIME INFORMATION SENDING UNIT
75 OTHER-PERSON POSITION INFORMATION REQUEST RECEIVING UNIT
76 OTHER-PERSON POSITION INFORMATION SENDING UNIT
77, 193 STORAGE UNIT
115 SNS SERVER
172 FRIENDSHIP INQUIRY UNIT
173 ADJACENT FRIEND RESPONSE RECEIVING UNIT
180A, 180B FRIENDSHIP INQUIRY RECEIVING UNIT
181A, 181B FRIENDSHIP CONFIRMATION UNIT
182A, 182B ADJACENT FRIEND RESPONSE SENDING UNIT
190 FRIENDSHIP CONFIRMATION REQUEST RECEIVING UNIT
191 FRIENDSHIP DETERMINATION UNIT
192 FRIENDSHIP RESPONSE SENDING UNIT
270 USER POSITION INFORMATION SENDING UNIT
271 ADJACENT PERSON INFORMATION REQUESTING UNIT
272 ADJACENT PERSON INFORMATION RECEIVING UNIT
290 ADJACENT PERSON INFORMATION REQUEST RECEIVING UNIT
291 ADJACENT PERSON EXTRACTING UNIT
292 ADJACENT PERSON INFORMATION SENDING UNIT
UA, UB, UC USER

The invention claimed is:

1. A first information processing apparatus, comprising:
a position obtaining unit; and
one or more processors configured to:
obtain content data;
obtain a first position information corresponding to the obtained content data, through the position obtaining unit,
wherein the position obtaining unit is configured to calculate the first position information based on a signal received from a position measuring apparatus;
obtain a second position information corresponding to a second person having a relationship with a first person creating the content data;
determine a difference between the first position information that further indicates a position of the first information processing apparatus associated with the first person and the second position information that further indicates a position of a second information processing apparatus associated with the second person; and
associate identification information corresponding to the second person with the content data based on a determination that the difference is less than a threshold value.

2. The first information processing apparatus of claim 1, further comprising:
an image capturing unit configured to capture image data as the obtained content data.

3. The first information processing apparatus of claim 1, further comprising:
a sound capturing unit configured to capture sound data as the obtained content data.

4. The first information processing apparatus of claim 1, wherein the position obtaining unit is further configured to calculate a time associated with the first position information.

5. The first information processing apparatus of claim 1, further comprising:
an interface, wherein the one or more processors are further configured to control the interface to transmit the content data and the first position information to the second information processing apparatus.

6. The first information processing apparatus of claim 1, further comprising:
an interface configured to receive, from the second information processing apparatus, the second position information corresponding to the second person.

7. The first information processing apparatus of claim 1, wherein the one or more processors are further configured to associate the identification information corresponding to the second person with the content data by adding the identification information corresponding to the second person to a file including the content data.

8. The first information processing apparatus of claim 1, wherein the one or more processors are further configured to perform facial recognition on the content data to detect an image of a third person included in the content data.

9. The first information processing apparatus of claim 8, wherein the one or more processors are further configured to associate identification information corresponding to the third person with the content data based on the facial recognition detecting the image of the third person in the content data.

10. The first information processing apparatus of claim 8, wherein the one or more processors are further configured to obtain and perform facial recognition on a plurality of pieces of temporally related content data to detect the image of the third person included in the content data.

11. The first information processing apparatus of claim 10, wherein the one or more processors are further configured to associate identification information corresponding to the third person with each of the plurality of pieces of temporally related content data in which the image of the third person is detected.

12. The first information processing apparatus of claim 11, wherein the one or more processors are further configured to determine that the identification information corresponding to the third person is unassociated with a piece of the plurality of pieces of temporally related content data, and associate the identification information corresponding to the third person to the piece of the plurality of pieces of temporally related content data.

13. The first information processing apparatus of claim 1, further comprising:
an interface, wherein the interface is controlled by the one or more processors further configured to transmit a notification to the second information processing apparatus associated with the second person based on the identification information corresponding to the second person being associated with the content data.

14. The first information processing apparatus of claim 13, wherein the interface is configured to receive a request from the second information processing apparatus associated with the second person for the content data, and the one or more processors are further configured to control the interface to transmit the content data to the second information processing apparatus associated with the second person.

15. The first information processing apparatus according of claim 1,
wherein the one or more processors are further configured to associate the identification information corresponding to the second person with the content data by embedding the identification information corresponding to the second person in the content data.

16. The first information processing apparatus according of claim 1, wherein
the first position information includes a first set of latitude and longitude values;
the second position information includes a second set of latitude and longitude values; and
the difference between the first position information and the second position information denotes a physical distance.

17. An information processing method, comprising:
in a first information processing apparatus:
obtaining, by one or more processors of the first information processing apparatus, content data;
obtaining, by the one or more processors, a first position information corresponding to the obtained content data, through a position obtaining unit of the first information processing apparatus,
wherein the first position information is calculated by the position obtaining unit based on a signal received from a position measuring apparatus;
obtaining, by the one or more processors, a second position information corresponding to a second person having a relationship with a first person creating the content data;
determining, by the one or more processors, a difference between the first position information that further indicates a position of the first information processing apparatus associated with the first person and the second position information that further indicates a position of a second information processing apparatus associated with the second person; and
associating, by the one or more processors, identification information corresponding to the second person with the content data based on a determination that the difference is less than a threshold value.

18. A non-transitory computer-readable medium having stored thereon, computer-executable instructions for causing a first information processing apparatus to execute operations, comprising:
obtaining content data;
obtaining a first position information corresponding to the obtained content data, through a position obtaining unit of the first information processing apparatus,
wherein the first position information is calculated by the position obtaining unit based on a signal received from a position measuring apparatus;
obtaining a second position information corresponding to a second person having a relationship with a first person creating the content data;
determining a difference between the first position information that further indicates a position of the first information processing apparatus associated with the first person and the second position information that further indicates a position of a second information processing apparatus associated with the second person; and
associating identification information corresponding to the second person with the content data based on a determination that the difference is less than a threshold value.

19. An information processing system, comprising:
a first information processing apparatus configured to:
obtain content data;
obtain a first position information corresponding to the obtained content data, through a first position obtaining unit associated with the first information processing apparatus,
wherein the first position obtaining unit is configured to calculate the first position information based on a signal received from a position measuring apparatus; and
transmit a request including the first position information to a second information processing apparatus; and
the second information processing apparatus configured to:
based on the request, obtain a second position information corresponding to a second person having a relationship with a first person creating the content data, through a second position obtaining unit associated with the second information processing apparatus; and transmit the second position information to the first information processing apparatus, wherein the first information processing apparatus is further configured to:

determine a difference between the first position information that further indicates a position of the first information processing apparatus associated with the first person and the second position information that further indicates a position of the second information processing apparatus associated with the second person, and associate identification information corresponding to the second person with the content data based on a determination that the difference is less than a threshold value.

* * * * *